Nov. 25, 1924.

M. BECK 1,516,697

BOOKBINDING MACHINE

Filed Jan. 19  1921

Witnesses:
W. P. Kilroy
Harry R. L. White.

Inventor:
Milton Beck
By Brown, Boettcher & Dienner
Attys.

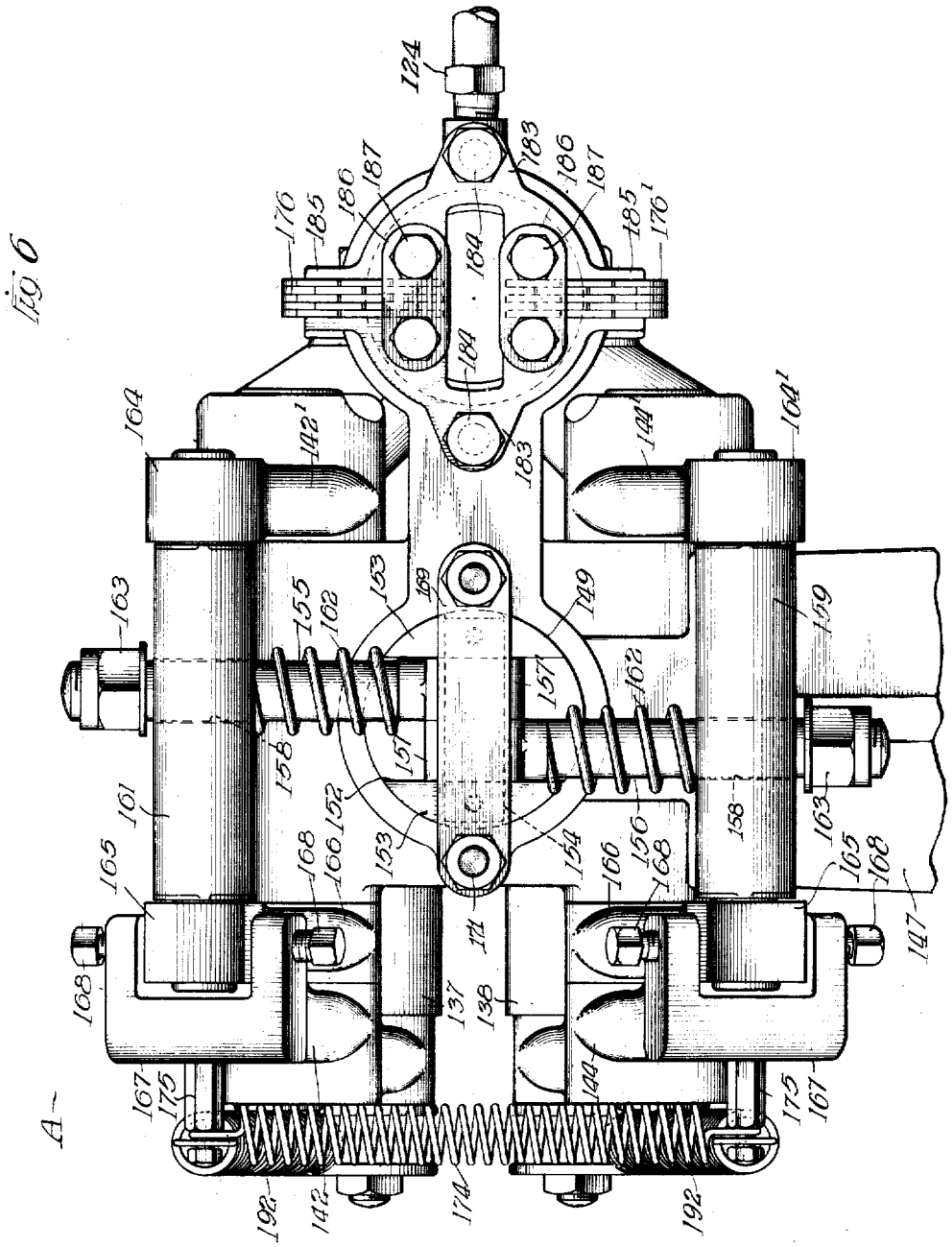

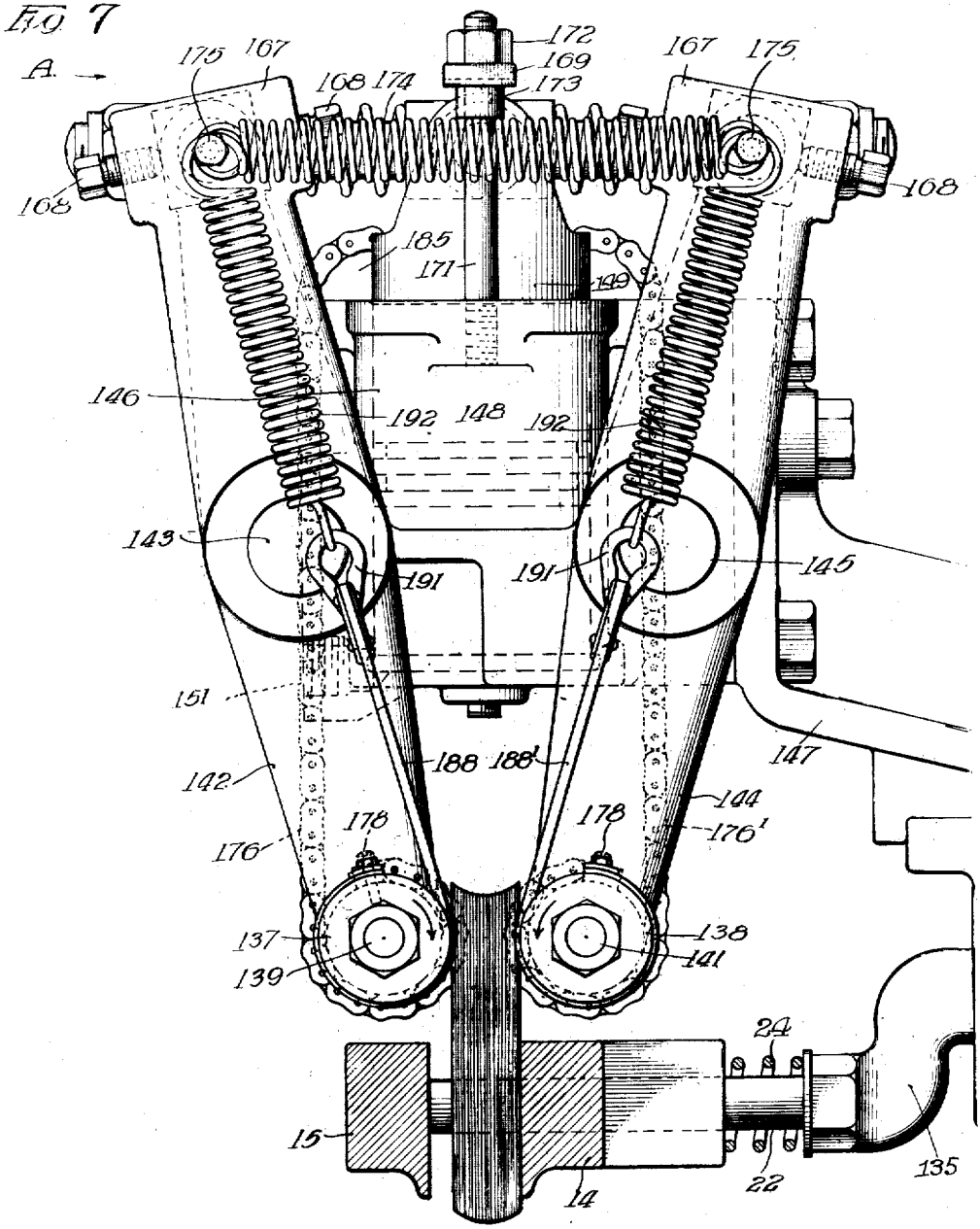

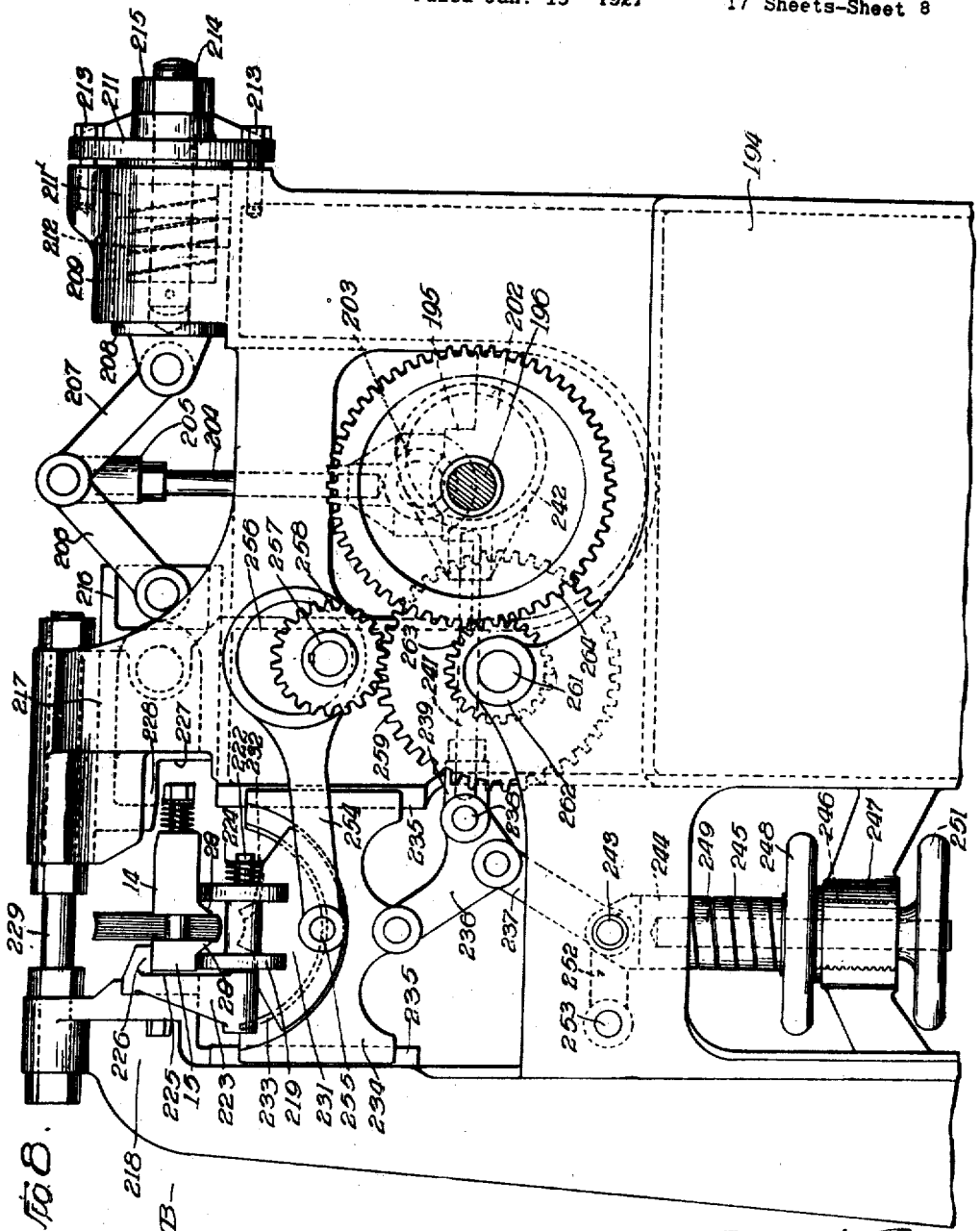

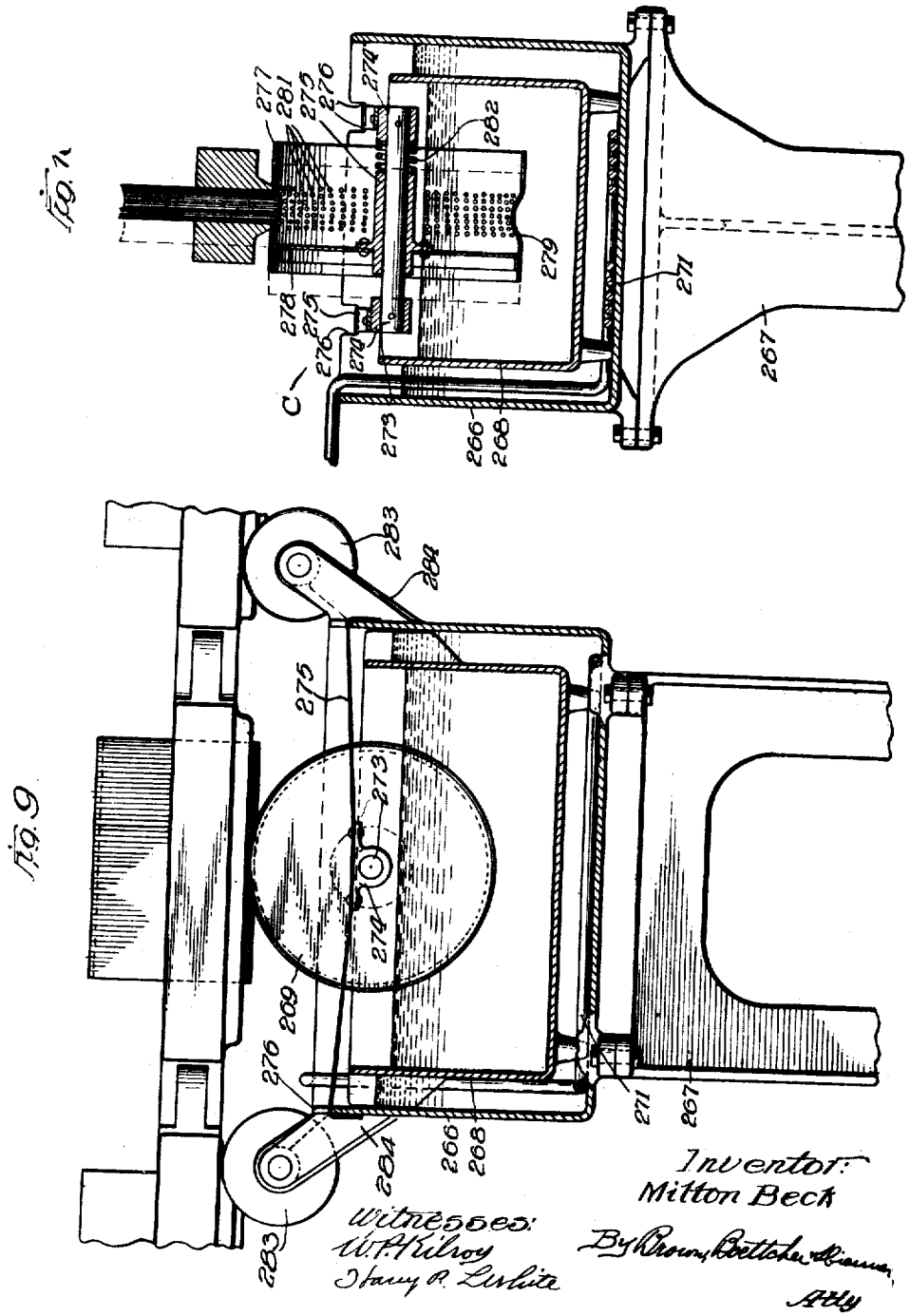

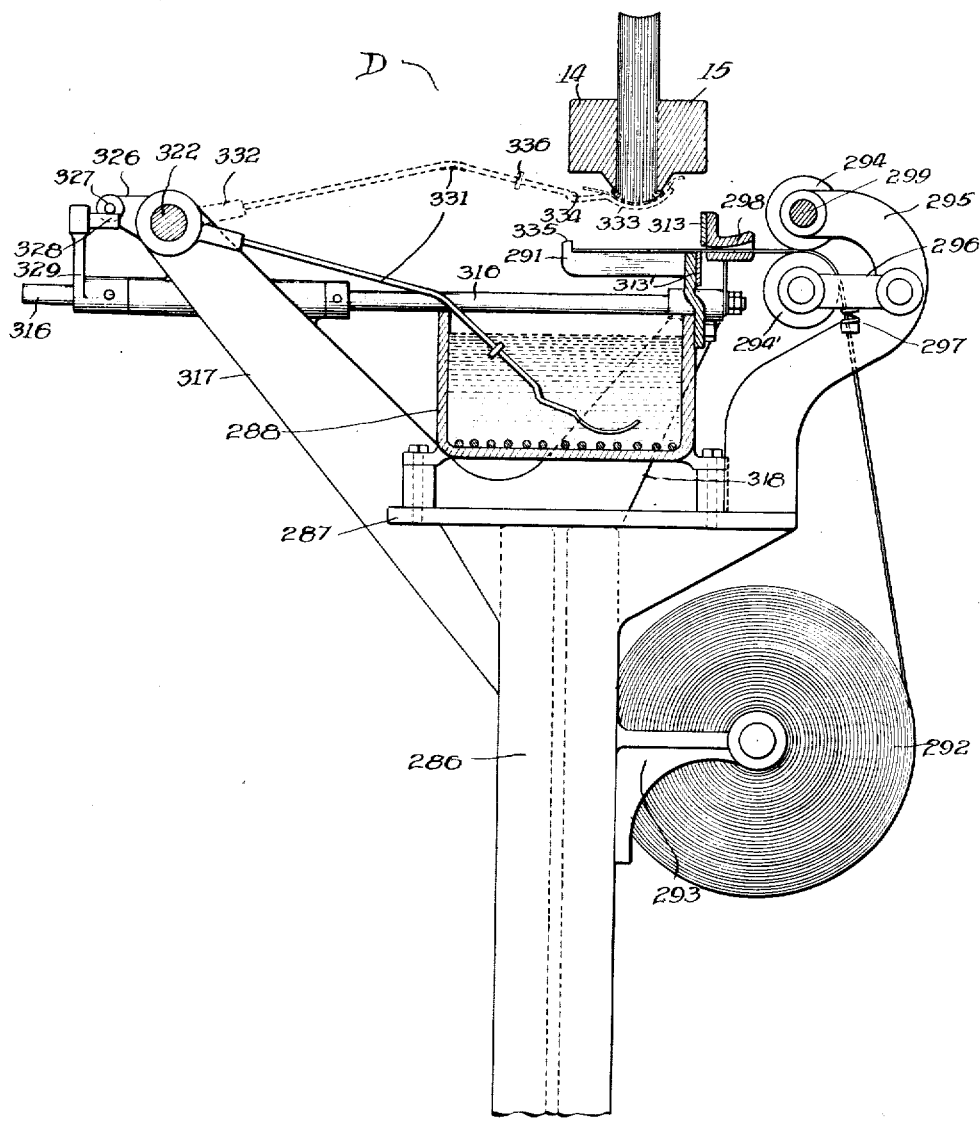

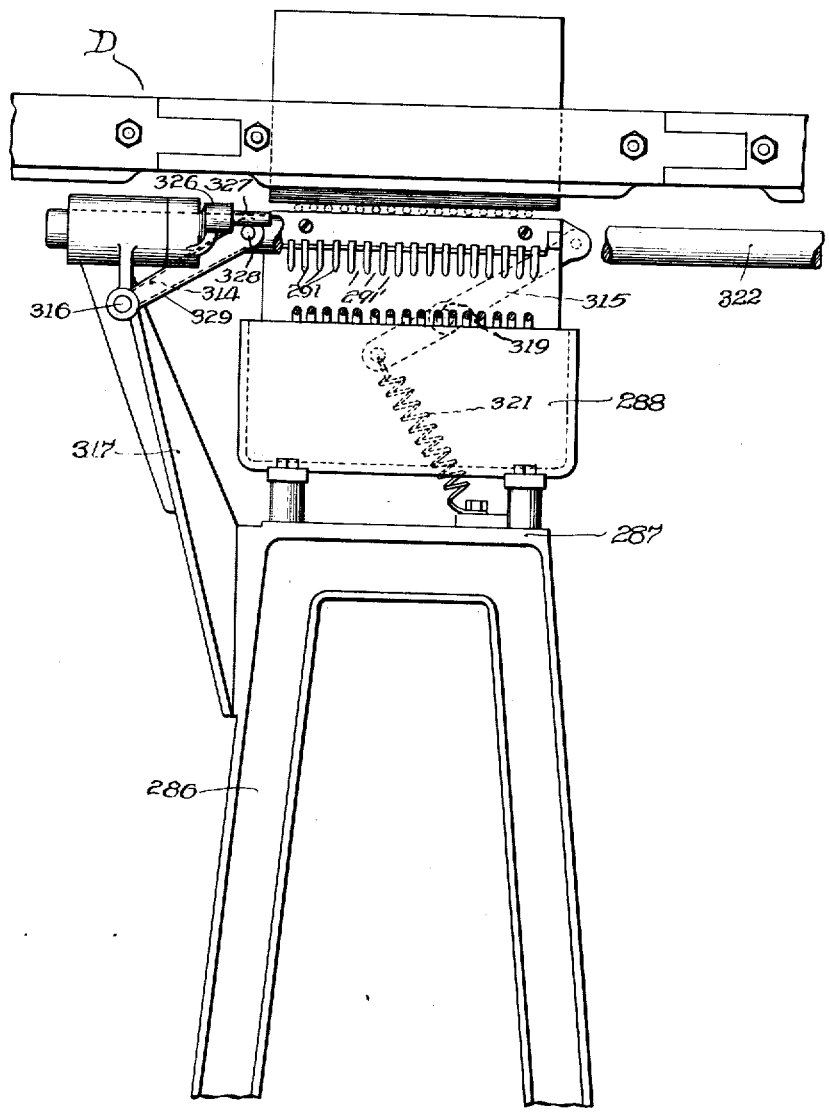

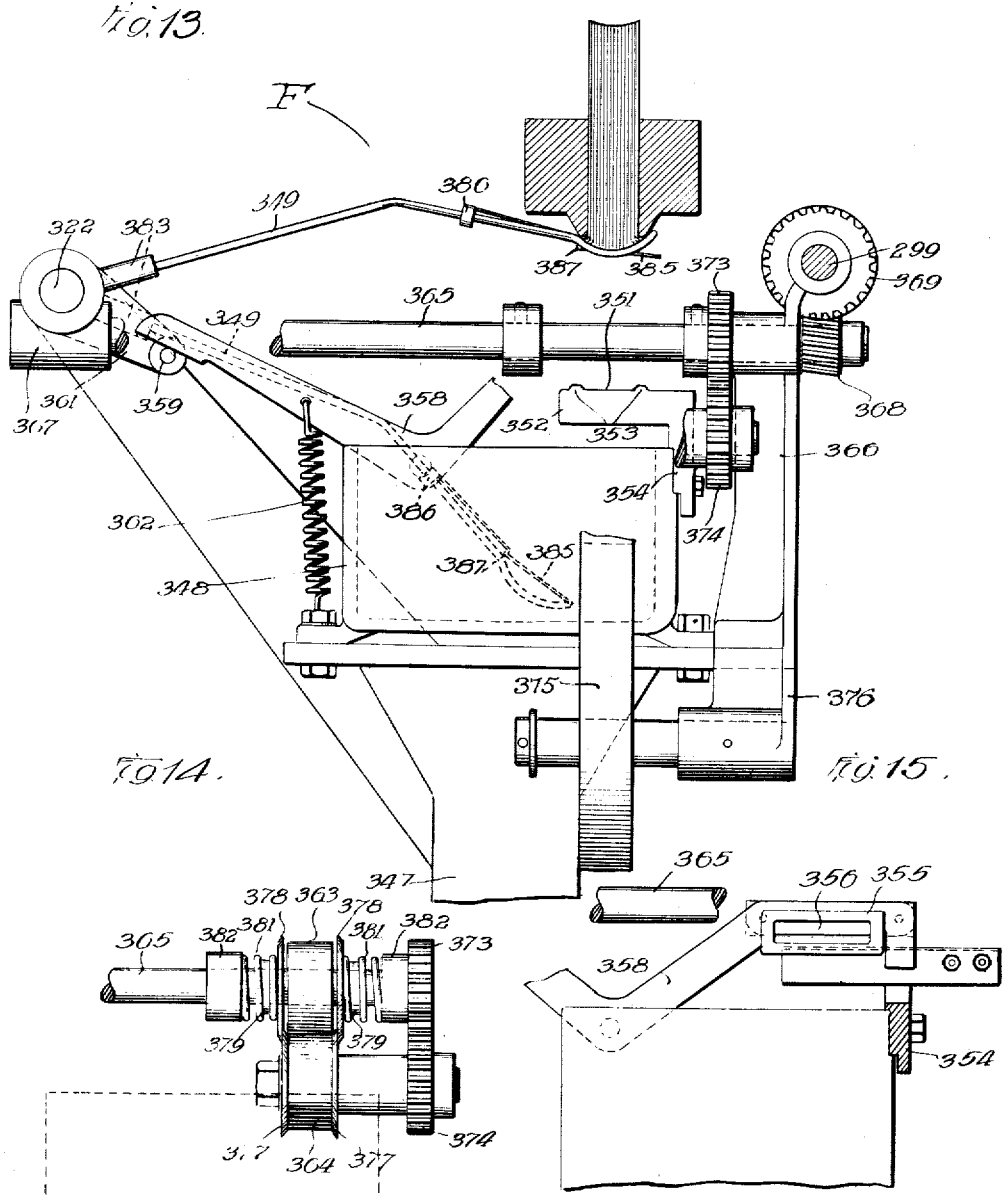

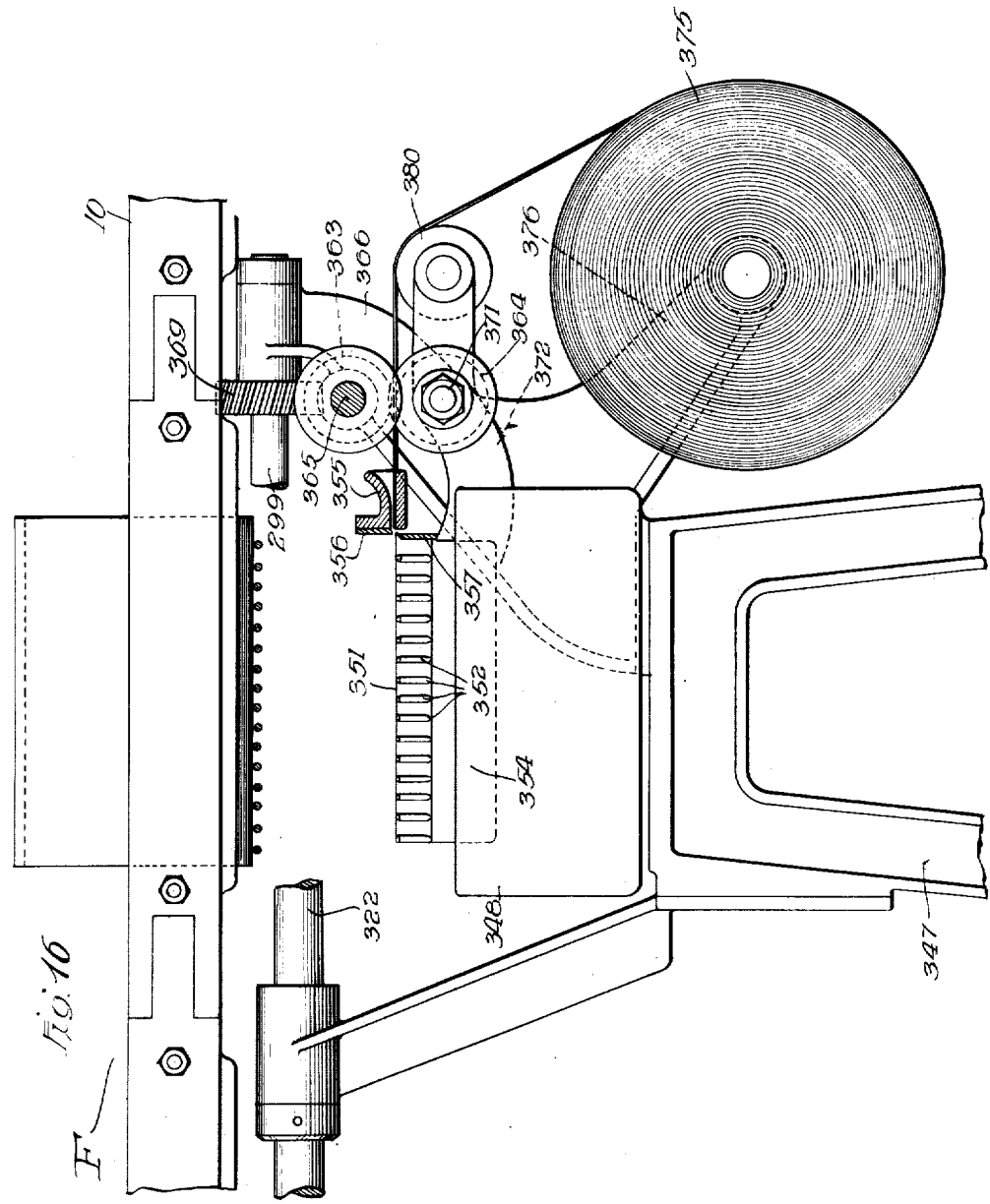

Nov. 25, 1924.
M. BECK
1,516,697
BOOKBINDING MACHINE
Filed Jan. 19, 1921   17 Sheets-Sheet 14
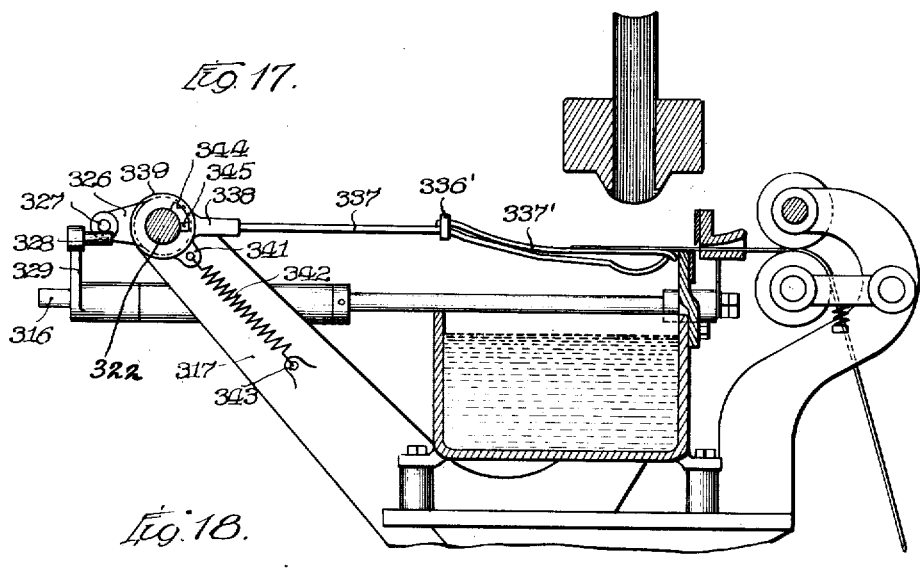
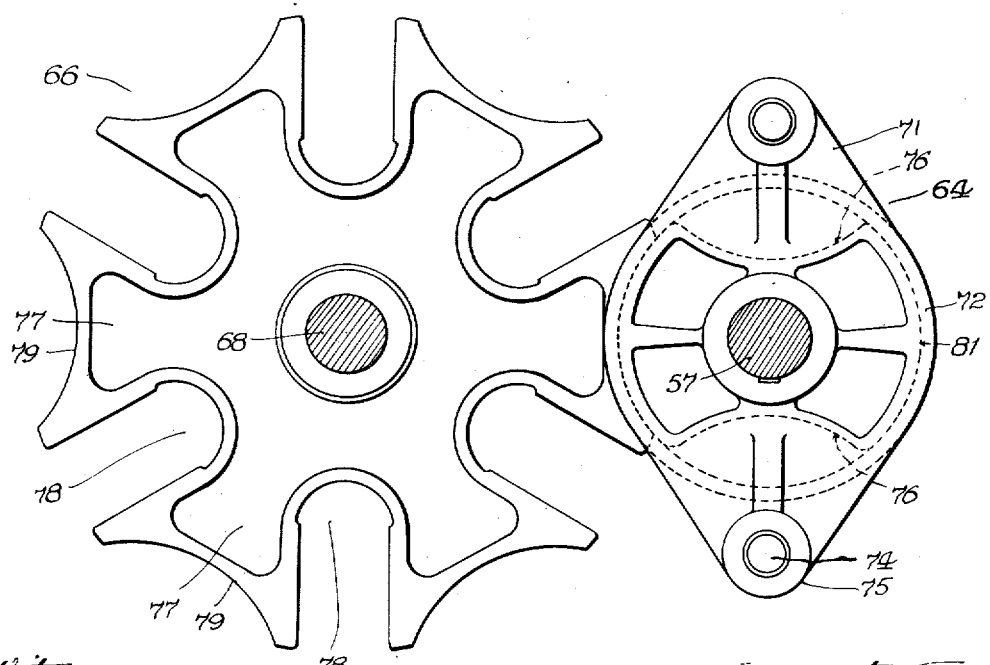

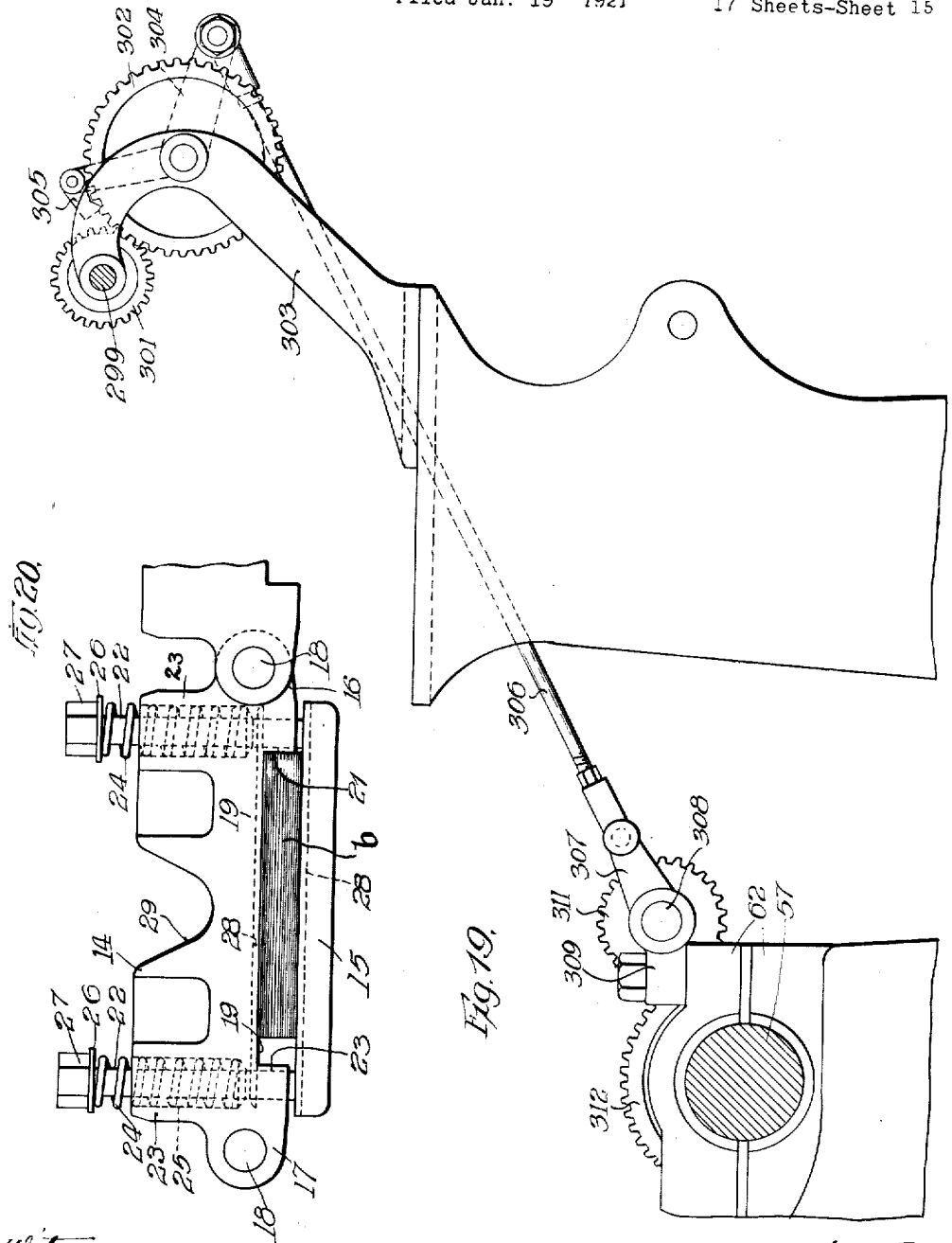

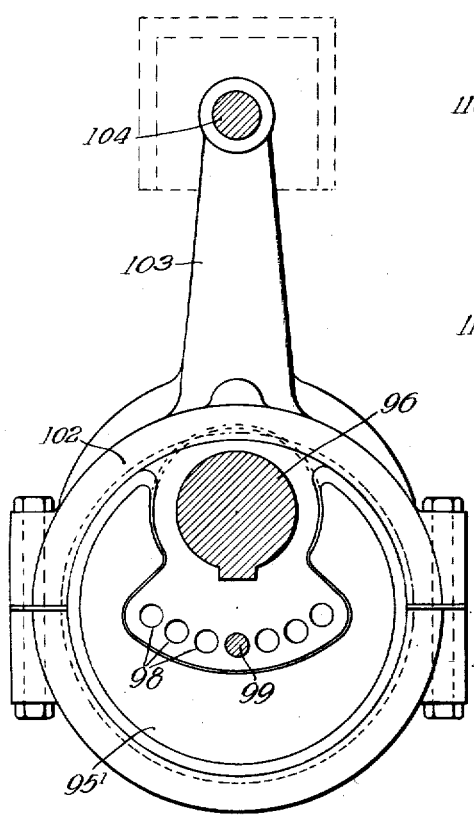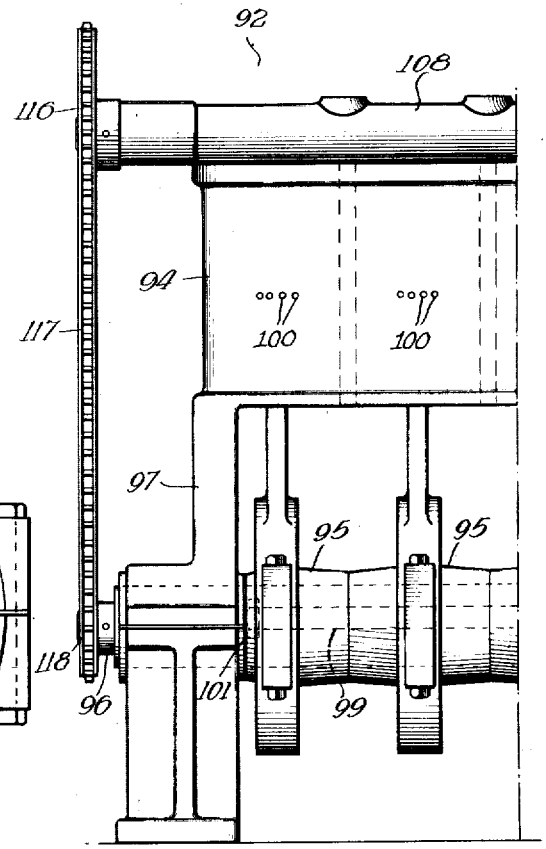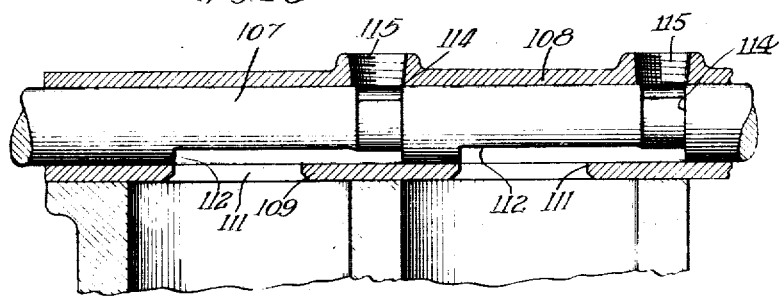

Nov. 25, 1924.
M. BECK
BOOKBINDING MACHINE
Filed Jan. 19, 1921
1,516,697
17 Sheets-Sheet 17
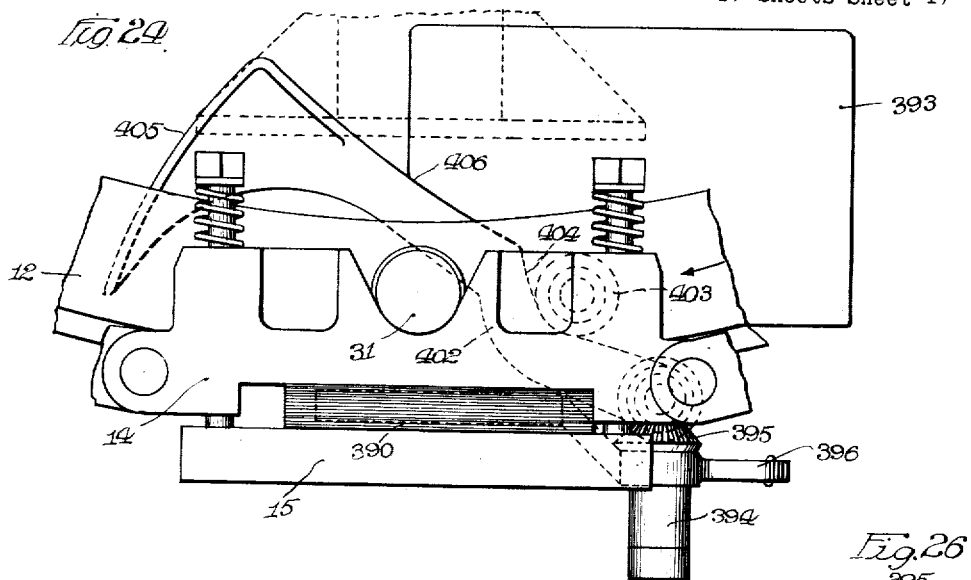
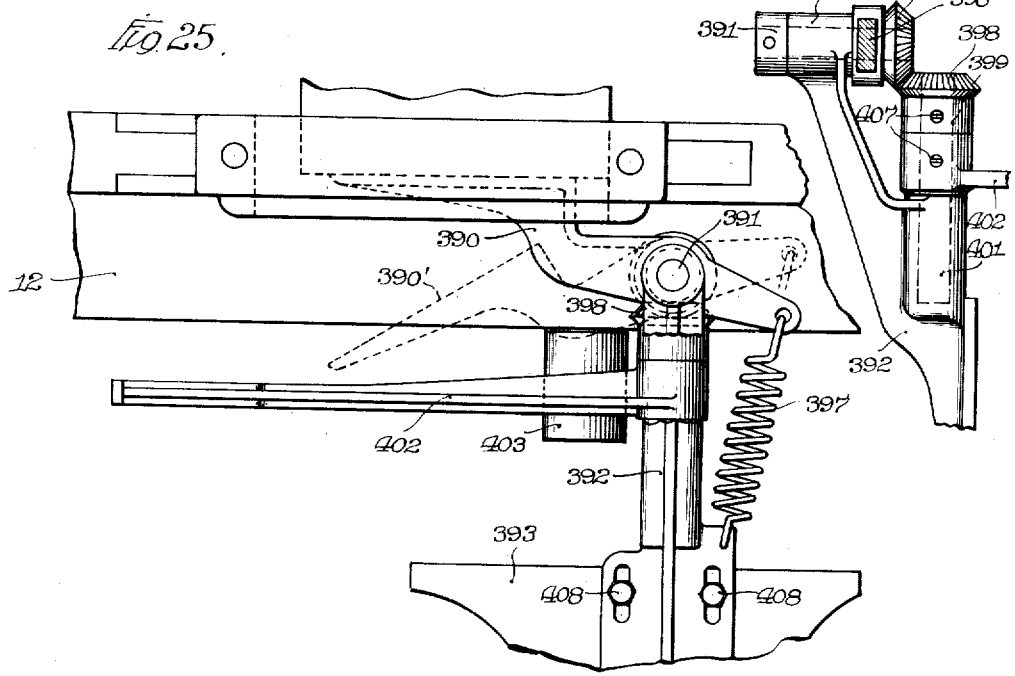
Witnesses
W. F. Kilroy
Inventor
Milton Beck
By Brown, Boettcher & Dienner
Attys.

Patented Nov. 25, 1924.

1,516,697

UNITED STATES PATENT OFFICE.

MILTON BECK, OF CHICAGO, ILLINOIS, ASSIGNOR TO JOSEPH J. WHITE, OF CHICAGO, ILLINOIS.

BOOKBINDING MACHINE.

Application filed January 19, 1921. Serial No. 438,300.

*To all whom it may concern:*

Be it known that I, MILTON BECK, a citizen of the United States, residing at Chicago, in the county of Cook and State of Illinois, have invented a certain new and useful Improvement in Bookbinding Machines, of which the following is a full, clear, concise, and exact description, reference being had to the accompanying drawings, forming a part of this specification.

The present invention relates to book binding machines, and more particularly to a machine for performing certain operations incident to the binding of round-backed books. The present machine is designed to receive the stitched or bound groups of signatures or leaves composing the book, and to thereafter successively present the book to mechanisms designed to operate thereon in a certain order of sequence for performing the following operations on the book, to-wit: (1) "rounding" the back of the book; (2) "backing" or expanding and upsetting the back of the book; (3) applying adhesive to the rounded and expanded back of the book; (4) applying a "super" to the adhesive-coated back of the book; (5) applying a second coating of adhesive to the back of the "super" (if this be necessary); (6) applying a lining strip of paper over the back of the "super."

One of the objects of the present invention is to provide an improved construction of rounding mechanism for rounding the backs of the books. This rounding mechanism is pneumatically timed and operated to the end of securing a more rapid operation, and a greater degree of adaptability of the mechanism to receiving different thicknesses of books without adjustment. The pneumatic operation of this mechanism results in the rounding rolls exerting a yielding pressure on the sides of the book, and also results in these rolls exerting a yielding rotational effort upon the sides of the book in imparting the rounded form thereto, so that the rounding operation is performed without danger to the machine or to the book. As a consequence of this yieldable characteristic the mechanism readily adapts itself to slight variations in thickness of the book or any irregularities therein, and avoids the positive, non-yielding action characteristic of a purely mechanical operation.

A further object of the invention is to provide improved backing mechanism characterized by a higher speed of operation than is obtainable in the backing mechanism of previous book binding machines of this class. The increased speed of the operating cycle is attained in part by backing the book over appropriate edges formed directly on the conveyor clamp in which the books are carried instead of first grasping each book in a special backing clamp and then backing the book over the edges of this clamp, as is generally performed in the prior art.

A further object of the invention is to provide improved and simplified mechanisms for applying both lining strips, i. e., the super or strip of open-work woven fabric, and the strip of lining paper which is superposed over the strip of super. Owing to the fact that each strip of the aforesaid lining materials must be applied to the adhesive surface on the back of the book, there is always the tendency for the mechanism which applies the strip of lining material to become fouled with any excess adhesive which is squeezed through or over the edges of the lining material. As a consequence the succeeding strips of lining tend to adhere to the applying mechanism unless the operator diligently keeps this excess adhesive removed from the surfaces of the applying mechanism. In the present construction this difficulty is obviated by so relating the applying surfaces to a suitable immersion tank that after each operation of applying a strip of lining material and before receiving a second strip these applying surfaces are immersed in hot water or any other liquid suitable for cutting and removing the glue.

Further objects concerned with the more minor mechanisms, and with the associated apparatus interconnecting the above operating mechanisms are: to provide improved gluing apparatus which will permit the discharge of excess adhesive conveyed to the back of the book and which will accommodate the lateral weaving motion of the chain conveyor; to provide an improved construction of air compressor or pulsator for timing and operating the rounding mechanism and the mechanisms for closing and opening the conveyor clamps in the operations of receiving and discharging the books; to provide improved driving mechanism for transmitting an intermittent step by step motion to the chain conveyor, and for intermittently driving certain of the above operating mechanisms at their proper periods in the operating cycle; to provide an improved construction of book clamp for making up the chain conveyor; and to provide improved stop mechanism for determining the position of the book in the clamp at the feeding operation. Other objects involving other mechanisms and other operating parts will be set forth in the accompanying description:

In the following detailed description, taken in connection with the accompanying drawings I have illustrated my invention in its preferred embodiment, but I wish it to be understood that the essence of the machine may be embodied in various modified constructions and arrangements, and that various features of the invention may be employed in other relations than those herein disclosed.

In the drawings:

Figure 6 is a plan view of the same;

Figure 7 is an end elevational view showing the rounding rolls grasping a book;

Figure 8 is a side elevational view of the backing mechanism, the lower part of the supporting frame being broken away to illustrate the mechanism on a larger scale;

Figure 9 is a longitudinal sectional view through the adhesive applying apparatus, illustrating the mounting of the adhesive roll;

Figure 10 is a transverse sectional view through the axis of the adhesive applying roll;

Figure 11 is an end view, partly in elevation and partly in section of the super applying mechanism;

Figure 12 is an elevational view of the same from the inside of the machine, certain of the parts being broken away to illustrate the construction;

Figure 13 is an end view of the paper lining applying mechanism, with parts of the construction broken away;

Figure 14 is a fragmentary elevational view of the feeding rolls and cutting discs of the above mechanism;

Figure 15 is a fragmentary view of the arrangement of cutting blades for severing the strip of paper;

Figure 16 is a view, partly in elevation and partly in section, of the paper lining applying mechanism, as viewed from the inside of the machine;

Figure 17 illustrates a modified construction of lining applying mechanism;

Figure 18 is an elevational view of the system of Geneva gears for transmitting the intermittent motion to the chain conveyor and to the several intermittently operating mechanisms;

Figure 19 is an elevational view illustrating in isolated relation the advancing mechanism for intermittently advancing the feed roll shaft;

Figure 20 is an enlarged plan view of one of the book clamps constituting part of the chain conveyor;

Figure 21 is a fragmentary side elevational view of the air compressor or pulsator;

Figure 22 is an enlarged detail elevational view of one of the eccentrics, illustrating the arrangement whereby the timing of the eccentrics may be adjusted;

Figure 23 is a detail sectional view through the valve housing of the above compressor; and Figures 24, 25 and 26 are fragmentary plan, front and side elevational views respectively, of the stop arm mechanism for gauging the insertion of the books into the book clamps.

*Conveyor mechanism and general structure.*

Figure 1:
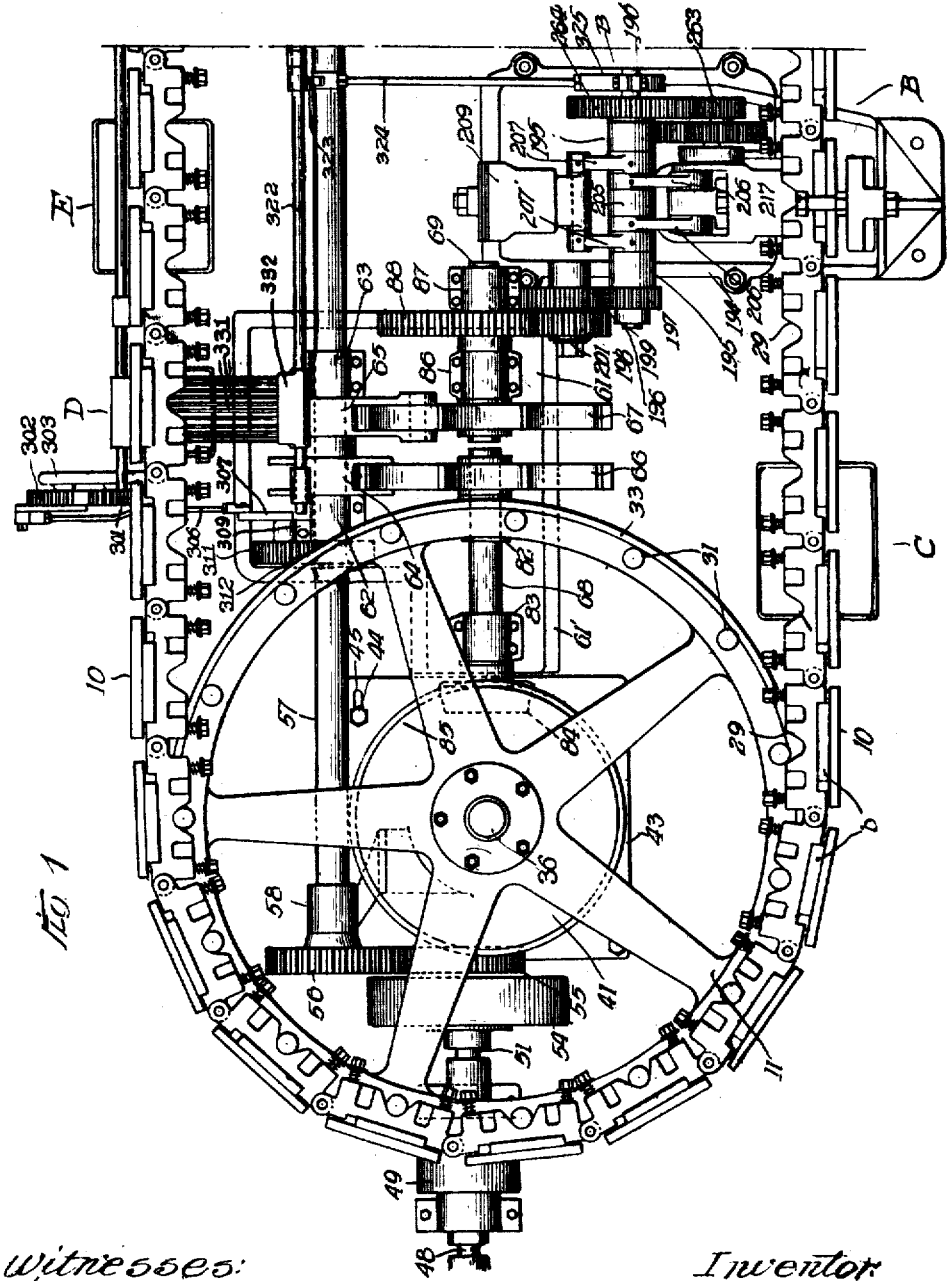
Figures 1 and 2 are divided plan views of the left and right halves of the machine respectively, the two figures being adapted to be joined at the dash and dot line for a comprehensive view of the machine.

I shall first describe the general structure of the machine and the operation of the conveyor mechanism, and then take up in detail each of the machines or operating units performing the operations above outlined, referring to these machines in the sequence in which they operate upon the books so that the progressive order of the cycle will be plainly apparent. The books *b* are adapted to be conveyed from one to the other of the several operating mechanisms through the medium of an endless conveyor 10 which is adapted to move in a horizontal plane around two end sprocket wheels 11—12. For clarity of the subsequent description I shall briefly enumerate the various mechanisms which are disposed around the circuit of the conveyor in the manner of "stations" for performing the successive operations on the books. As clearly shown in Figs. 1 and 2 (when joined) the books are inserted in the conveyor 10 at the point A'; at the station or machine A the books are rounded; at the machine B the rounded backs of the books are upset or "backed"; at the point C the adhesive is applied to the backs of the books; at the mechanism D the super is applied; at the point E a second coating of adhesive is applied over the super; at the mechanism F the liner strip is applied; and at the point G the books are discharged. The conveyor 10 is constructed in the form of a chain consisting of a series of links pivotaly connected together, each link being arranged to carry a book. As shown in Figure 20, each link is constructed as a spring pressed book clamp and comprises an inner link bar 14 and an outer clamping plate 15. Each link bar is formed at one end with a pivotal tongue 16 and at the other end is bifurcated, as indicated at 17, for the reception of the pivotal tongue 16 of the next succeeding link. The tongue 16 and bifurcated end 17 are apertured to receive a suitable pivot pin 18. The face of the link bar 14 is recessed as indicated at 19 to provide a rectangular opening for receiving the book, the book being held in said recess in vertical position and engaging the rear shoulder 21 (with reference to the direction of motion) which acts as a positioning stop for insuring the proper placing of the book in the series of clamps. The book is firmly held in the recess 19 by the outer clamping plate 15, which is normally drawn towards the link bar 14 under tension imposed upon spring bolts 22—22 extending from the ends of the clamping plate 15. These spring bolts pass through guide hubs 23 at the ends of the link bar 14 and extend inwardly from the link bar for supporting compression springs 24. To make the clamp more compact and to give a greater length of spring, the opening in the rear of each hub 23 is counterbored as indicated at 25 for retaining the inner end of the spring 24. The other end of each spring 24 engages against a washer 26 and nut 27 threading over the end of the spring bolt 22. The widths of the book engaging faces in the recess 19 and on the outer clamping plate 15 are increased by the provision of flange extensions 28 extending longitudinally along the bottom of the link bar 14 and along the bottom of the clamping plate 15. The purpose of these flange extensions is to provide appropriate backing edges on the bottoms of the book clamp members over which the side edges of the book are backed, as will be described in the backing operation. The inner face of the link bar 14 is formed with a rounded recess 29, intermediate the hubs 23—23, for engaging with the cooperating sprocket ends 31 in the rim of the sprocket wheels 11 and 12. The rim or felloe of each sprocket wheel 11 and 12 is of right angle cross section consisting of a horizontal and an outer vertical flange (Figure 4), the outer edge of the horizontal flange being beveled downwardly as indicated at 33 to facilitate the engagement of the link bars 14 upon the horizontal flange of the wheel rim. The sprocket pins 31 are equi-distantly spaced about the rim for engagement with the successive links, each pin projecting above the plane of the wheel 11 for engagement in the recess 29 and having its lower end mounted in a boss 35 formed integrally in the angular rim (Figure 2). The sprocket wheels 11 and 12 are supported upon vertical stub shafts 36 and 37, respectively, which have bearing support in vertical bearings 38 and 39 in the two end pedestals 41 and 42. The pedestals 41 and 42 are each provided with a flanged base 43 which is bolted to the floor or other bed surface by bolts 44. The bolts extend through longitudinal slots 45 in the base so as to permit of longitudinal adjustment of the pedestals relative to each other, the right hand pedestal 42 being provided with adjusting screws 46 which engage in a stationary plate 47 and permit longitduinal adjustment of the pedestal 42 for taking up slack in the chain conveyor 10.

Figure 2:
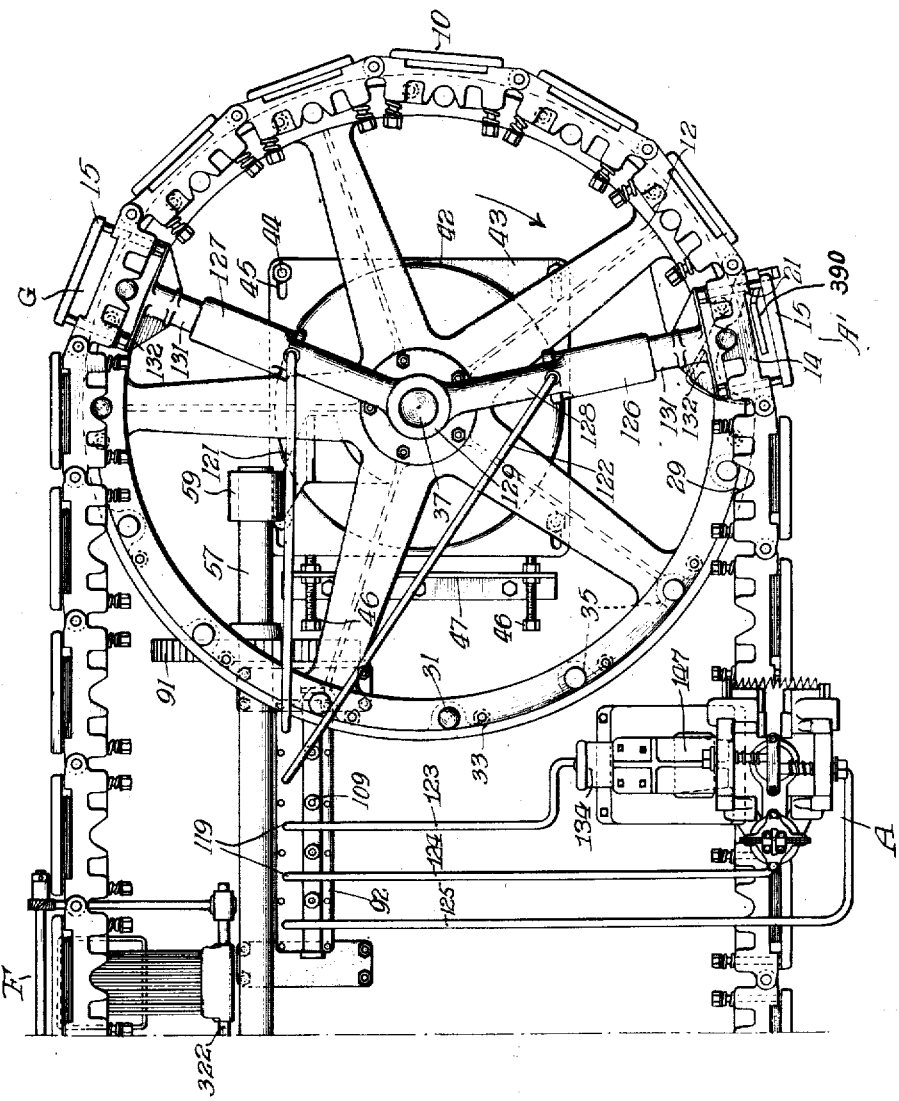
Figure 3:
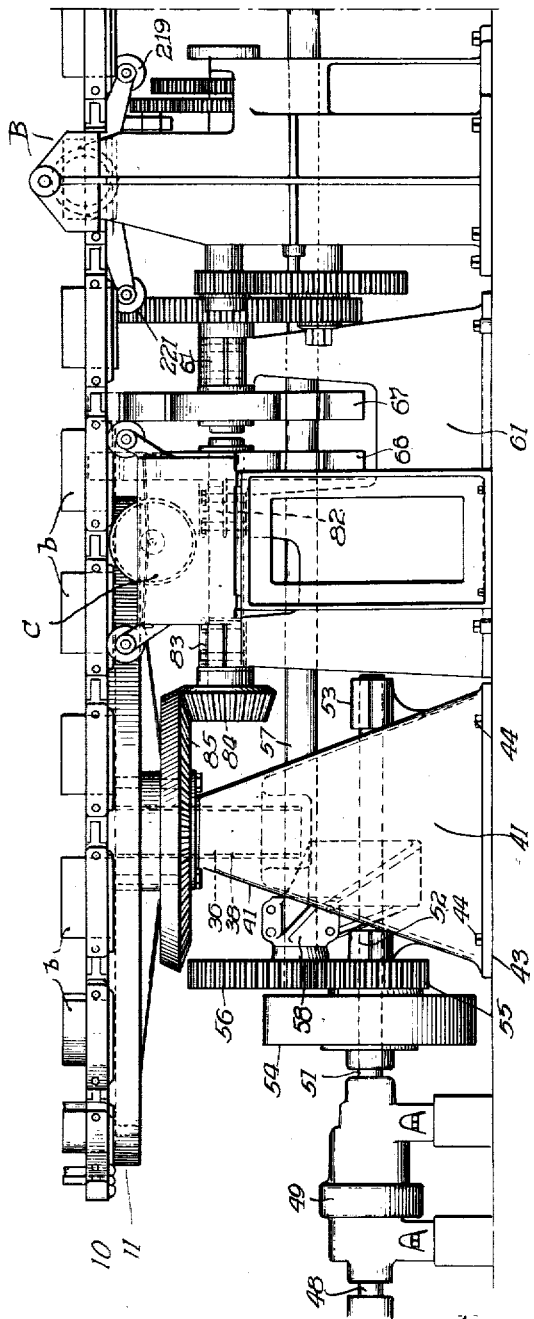
Figures 3 and 4 are similar elevational views of the machine, these two figures likewise joining at the dash and dot line.

As best shown in Figures 1 and 3, the drive for the chain conveyor and the several operating mechanisms is from an electric motor or other suitable source of power to the high speed shaft 48 of a speed reducing gear unit 49. Here the high speed is transformed into a low speed, high torque drive which is transmitted to the short drive shaft 51. This shaft is extended through the hollow pedestal 41 and has spaced bearing support in the two bearings 52 and 53 on opposite sides of the pedestal. Mounted on this short drive shaft is a fly wheel 54 and a spur gear 55, the latter of which meshes with a relatively larger spur gear 56 on the longitudinally extending main drive shaft 57. This main drive shaft extends from the pedestal 41 to the pedestal 42 at the other end of the machine and has bearing support at each end in laterally extending bearings 58 and 59 projecting from the sides of the pedestals. To the right of the pedestal 41 is located a casting in the form of a bearing support 61 for supporting the system of Geneva gearing which transmits the intermittent motion to the link conveyor 10, and to certain of the operating mechanisms of the machine. This bearing support 61 is provided with two spaced bearings 62 and 63 for supporting the main drive shaft 57, and mounted on this drive shaft intermediate these bearings are a pair of male Geneva gears 64 and 65. These male Geneva gears are adapted to have intermittent mesh with two cooperating female Geneva gears 66 and 67 of relatively larger diameter which are mounted on independent shafts 68 and 69 extending parallel to the main drive shaft 57.

Referring particularly to Figure 18, it will be observed that each of the male Geneva gears 64 and 65 consist of a wheel having a laterally flanged circumference and provided with ears 71 extending from the lateral flanges 72. Two pairs of these ears extend out from the circumference of the wheel at diametrically opposite points, the ends of these ears being formed with hubs for supporting pivot pins 74, upon which are mounted rollers 75. The periphery of the wheel is recessed between the pairs of ears 71, as indicated at 76, for permitting passage of the interlocking teeth of the cooperating female Geneva gear. The two male Geneva gears 64 and 65 are rigidly keyed on the main drive shaft 5 with the advancing rollers 75 of one Geneva gear offset 90 degrees with respect to the advancing rollers of the other Geneva gear. Each of the female Geneva gears 66 and 67 comprises a plurality of interlocking teeth 77 with intervening radial recesses 78 extending inwardly toward the hub of the gear. The outer face of these interlocking teeth 77 is formed with an inward curve 79 corresponding to the curvature of the rim 81 of the male Geneva gear. In the non-advancing position of the gears this inwardly curved face 79 is adapted to interlock with the curved periphery 81 of the male Geneva gear and prevent any motion of the female Geneva gear. The male Geneva gear is free to revolve, and upon the advancing roller 75 coming into the adjacent recess 78, the female Geneva gear is advanced the space of one tooth, the edges of the teeth 77 passing through the inwardly curved recess 76 on each side of the advancing roller 75. Each female Geneva gear is provided with six tooth pockets or recesses 78 for cooperation with the two advancing rollers 75 of its associated male Geneva gear, and it will hence be apparent that for every half revolution of the male Geneva gear the female Geneva gear will be advanced through sixty degrees with the result that the female Geneva gear will be intermittently advanced through one complete revolution for every three revolutions of the male Geneva gear. The placing of the two male Geneva gears 64 and 65 at right angles to each other result in one female Geneva gear being advanced while the other is stationary and vice versa.

The bearing support 61 is formed with a lateral extension 61' (Figure 1), and rising from this bearing support and its extension are two bearings 82—83 for supporting the shaft 68 of the female Geneva gear 66. The other end of this shaft 68 carries a bevel pinion 84 which meshes with a large bevel gear 85 secured to the hub of the sprocket wheel 11. The gears 84 and 85 are so proportioned that the sixty degree advancing motion imparted to the female Geneva gear 66 will advance the link conveyor 10 a distance equal to the length of one link. The shaft 69 of the other female Geneva gear 67 has support in two bearings 86 and 87, and on the shafts between these bearings is mounted a large spur gear 88. This large gear 88 functions to transmit an intermittent actuating motion to the backing machine B, as I shall hereinafter describe in connection with the detail description of such machine.

Air pulsator and pneumatic timing system.

Figure 4:
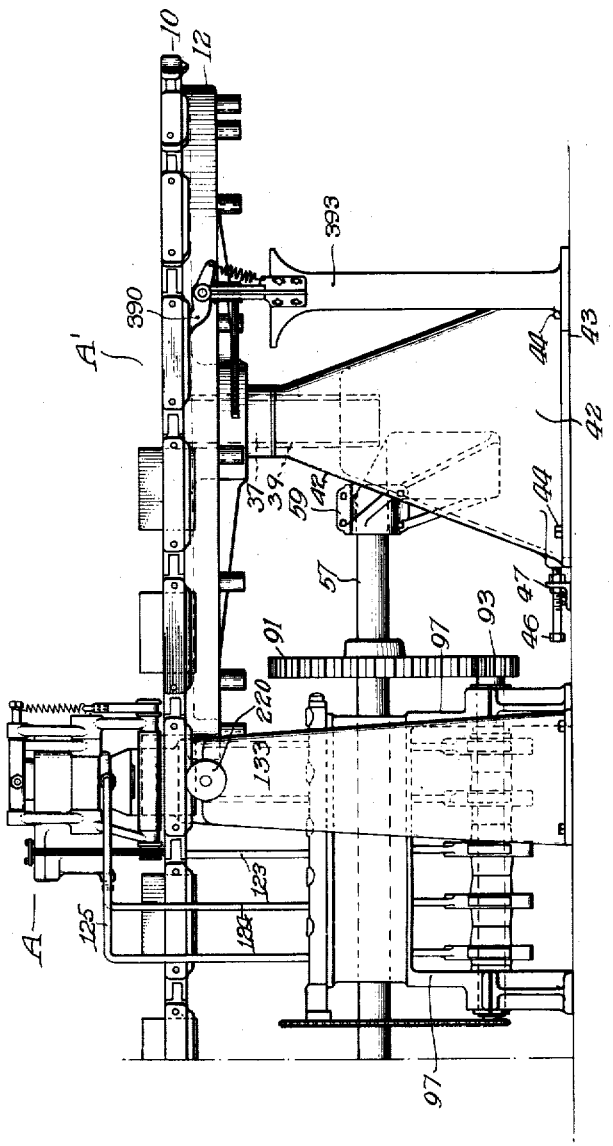

Adjacent the other pedestal 42 at the right hand end of the machine (Fig. 2) the continuous rotating main shaft 57 is provided with a large spur gear 91 for driving the air pulsator 92 which performs a timing and operating function for certain of the mechanisms to be later described. The spur gear 91 meshes with a relatively small spur pinion 93 on the operating shaft of the pulsator 92 (see Fig. 4) so that a relatively higher speed will be transmitted to the pulsator. Referring to Figures 2 and 4 in conjunction with Figures 21 and 22, it will be noted that the pulsator comprises five pneumatic cylinders in which suitable pistons (not shown) reciprocate under the action of eccentrics 95 on the horizontal operating shaft 96. The shaft 96 has bearings in the two end supports 97 which support the cylinder block. Each of the five pulsators 94 controls the operation of an independent mechanism cooperating in the cycle of the machine, and owing to the fact that certain of these mechanisms operate at different periods in the cycle and must have accurate timing of their period of operation, it is necessary that means be provided for accurately adjusting the relative positions of the several eccentrics 95 in order that the pressure pulsations created in the cylinders occur in the proper sequence and at the proper time. This is preferably accomplished by making one of the eccentrices 95 a mother eccentric and disposing the other eccentrics relative thereto with the proper angular deviation for securing the correct timing. Figure 22 shows the mother eccentric 95' which is rigidly secured to the operating shaft 96. The above mother eccentric and the four other eccentrics 95 are all provided with a plurality of holes 98 disposed on an arc concentric with the axis of the operating shaft 96. A long bolt or rod 99 is passed through the aligned openings 98 of the entire series of eccentrics and is provided with nuts 101 threading over the ends thereof by which the four eccentrics 95 may be rigidly clamped to the mother eccentric 95'. When it is desired to vary the timing of any pulsator cylinder the bolt or rod 99 is withdrawn, whereupon the eccentric 95 of the required cylinder is angularly adjusted and the bolt 99 is then reinserted through the series of eccentrics and the eccentrics are all clamped together. The eccentrics 95 are surrounded by eccentric straps 102 which are provided with connecting rods 103 having connection with wrist pins 104 in the pulsator pistons.

Certain of the mechanisms which are actuated by the pulsator 92 (these mechanisms being hereinafter described) are required to have a relatively quick action in order to perform their functions properly and in the correct sequence in the brief interval that the chain conveyor 10 is at rest between its successive advancing steps. Consequently, it is desirable that the compressor or pulsator 92 operate with sufficient rapidity to insure that the compression and rarefaction impulses will be sharp and quick, whereby the several operations controlled by these impulses can be crowded into a smaller time interval with consequent speeding up of the operation of the machine. Accordingly, the speed of the pulsator 92 is geared up by making the driving gear 91 considerably larger than the pinion 93. As a consequence of this accelerated speed, it is necessary to cut out or nullify certain of the compression and rarefaction impulses so that the actuating impulses will occur only at the proper interval. This is accomplished by a rotary valve 107 extending across the tops of the pulsator cylinders, as shown in Figures 21 and 23. The valve 107 extends the entire length of the pulsator and is confined in a valve sleeve 108 cast integral with the cylinder cover 109. In line with each of the pulsator cylinders the cylinder cover 109 is formed with port openings 111 which are adapted to communicate with valve openings 112, formed by milling flat spots across the surface of the rotary valve 107. These valve openings 112 extend longitudinally of the valve beyond the port opening 111 to communicate with annular grooves 114 which register with atmospheric ports 115 in the top of the valve sleeve 108. These exhaust or atmospheric ports 115 may communicate with a suitable manifold leading to a muffler or outside of the building. The valve 107 is driven in predetermined timing with the operating shaft 96 through a sprocket 116 on the end of the valve shaft, which has connection through a driving chain 117 with a sprocket 118 on the operating shaft 96. The cylinder cover 109 is provided with a series of outlet ports 119, of which there is one in register with each of the pulsator cylinders, and extending from these outlet ports are the pneumatic pipes 121—122—123—124 and 125 for controlling the mechanisms to be described. In the operation of the pulsator the reciprocation of the pulsator pistons normally tends to create compression and rarefaction impulses in the pulsator cylinders and their respective pipe lines 121—125, but during the non-operative period of the cycle this action is defeated by the valve ports 112 revolving around into register with the port openings 111. This position of the valve port opens a direct communication to atmosphere which relieves the compression and rarefaction impulses. During the operative period of the cycle the port openings 111 are blanked off by the solid periphery of the rotary valve 107 and thus the compression and rarefaction impulses are directly effective through the pipe lines 121—125 for actuating the pneumatically controlled mechanisms. By making the pneumatic strokes quick and positive the possibility of leakage into the pipe lines or cylinders rendering the strokes incomplete or non-effective is reduced to a minimum. The compressor cylinders are preferably provided with inlet ports 100 at the lower ends thereof for preventing such a rarefied condition from developing in any of the cylinders as would nullify the compression stroke.

The operations of feeding the book units into the link clamps 14—15 and of discharging the finished book units from the clamps after the several operations have been performed thereon occur while the link clamps are in transit about the circumference of the right-hand sprocket wheel 12. These two operations are controlled by pneumatic cylinders 126 and 127 which are carried on the ends of a bracket 128 having a central hub 129 stationarily mounted on the central pivot shaft 37 of the sprocket wheel 12. Each pneumatic cylinder carries a plunger 131 supporting a plate or yoke 132 at its outer end, which is adapted to engage the inner projecting ends of the spring bolts 22 of each clamping link. The air pipe 121 leading from the end cylinder of the pulsator 92 communicates with an end port in the pneumatic cylinder 127, and the air pipe 122 from the next cylinder of the pulsator 92 communicates through an end port with the pneumatic cylinder 126. As each link clamp is intermittently advanced into the feeding position designated A' at the front of the machine, a compression impulse in the pipe line 122 forces the plunger 131 forwardly and opens the clamp by thrusting the front plate 15 away from the link bar 14. The book is then inserted between the two clamping members, with the bound edges of the leaves or signatures facing downwardly and with the right-hand vertical edge of the leaves abutting the end shoulder 21. In order that the books shall all be inserted to a uniform depth in the book clamps there is provided at the feeding position A' a gauging or stop arm 390 which is moved up into each clamp as the clamps are advanced into feeding position. As illustrated in Figures 24 and 25, this arm is mounted on a horizontal shaft 391 which is supported in the upper end of a bracket 392, which in turn is adjustably supported on the upper end of a standard 393 rising from the floor at the feeding position. The arm 390 is formed with an elbow bend and is formed with a flat outer surface 390' which is adapted to move up between the inner and outer clamping members of each book clamp and define a flat positioning stop upon which the books are rested in inserting them in the clamps. The shaft 391 is journaled in the horizontal bracket hub 394, and mounted on this shaft, beyond the hub of the arm 390 is a bevel gear 395. Projecting from the hub of the arm 390 and oppositely to the arm 390 is an arm 396 between the end of which and the stationary bracket 392 is extended a tension spring 397 which normally tends to raise the positioning arm 390 up between the clamping members 14 and 15. Meshing with the bevel gear 395 is a bevel gear 398 which is rigidly fastened on a vertical shaft 399 having bearing support in a vertical bearing 401 in the bracket 392. Rigidly mounted on the vertical shaft 399 is a horizontally swinging arm 402 which is adapted to project beneath the rim of the sprocket wheel 12. The arm 402 normally extends into the path of a series of rollers 403 extending downwardly in spaced sequence about the bottom of the rim of the sprocket wheel 12. The rollers 403 are adapted to impart a relatively quick inward and outward oscillatory motion to the arm 402, and to this end the arm is formed with a relatively steep cam rise 404 and a relatively abrupt drop-off tail 405 at the outer end of the arm. A long, comparatively flat dwell 406 extends between the cam surface 404 and the drop-off portion 405 and is adapted to hold the arm in outward position during the movement of the roller 403 past the same. In the operation of the device, the book is inserted into the open clamp with its back resting upon the stop arm 390, whereupon the rarefaction impulse in the cylinder 126 draws the piston 131 inwardly and allows the front clamping plate 15 to engage the book unit and bind the same in the clamp. Immediately thereafter the sprocket wheel 12 and chain conveyor begin their concurrent advancing motion. At this instant, a roller 403 lies substantially in immediate contact with the cam surface 404, and by virtue of the steep rise of this cam surface the first fraction of movement of the roller operates to quickly oscillate the arm 402 outwardly. This motion is transmitted up through the bevel gears 398 and 395 to the arm 390, resulting in this arm being drawn down from between the clamping members with a quick motion so as to clear the rear end of the clamp in its advancing movement. As the chain conveyor approaches the end of its one step advancement, the roller 403 rides off the tail portion 405 and allows the arm 402 to swing inwardly into engagement with the next succeeding roller, this permitting the stop arm 390 to move upwardly with a quick motion into the next book clamp as the chain conveyor comes to rest. The hub of the arm 402 and the hub of the bevel gear 398 are adjustably secured to the shaft 399 by set screws 407 in order that the angular relation between these two may be adjusted to adjust the timing of the mechanism. To permit the books to be inserted to varying depths in the book clamps the bracket 392 is vertically adjustable as an entirety on the standard 393 through the provision of bolts 408 engaging in vertical slots in the bracket. The book units are discharged from the other side of the sprocket wheel 12 by the action of the plate 132 pushing outwardly on the heads of the spring bolts 22 and forcing the outer clamping plate 15 out of engagement with the book, thereby allowing it to drop down from between the clamping jaws upon a suitable conveyor, chute or the like for transferring the book unit to the casing-in machine, or other mechanism.

*Rounding mechanism.*

From the feeding position A', the books are progressively fed to a rounding machine A in the front stretch of the chain conveyor 10, wherein the back of each book unit is rounded as illustrated in Figure 7. This rounding mechanism is mounted on a pedestal support 133, and comprises a pneumatic cylinder 134 on the upper end of the supporting standard for opening the book clamps after they enter into operating position in the rounding mechanism. The cylinder 134 has communication with pipe line 123 extending from the pulsator, as shown in Fig. 2. The plunger of this cylinder carries a bracket member 135 which is adapted to engage the inner ends of the spring bolts 22 of each clamp and to thrust the outer clamping plate 15 outwardly for releasing the book. Prior to being released from between the link bar 14 and clamping plate 15, the book unit is grasped on opposite sides by two horizontal rounding rolls 137 and 138. These rolls may be of steel or any other desired material for imposing the rounding pressure upon the sides of the book unit, and are mounted on horizontal shafts 139 and 141. The projecting ends of the shaft 139 are journaled in hubs in the lower ends of two substantially vertical oscillatory levers 142—142', which are pivoted at intermediate points on a horizontal pivot shaft 143. The shaft 141 of the other rounding roll 138 is similarly journaled in hubs in the ends of similar levers 144—144' journaled at intermediate points on a corresponding pivot shaft 145. The pivot shafts 143 and 145 have bearing support in a head portion 146 which is supported directly above the chain conveyor 10 by a bracket 147 which is secured to the top of a pneumatic cylinder 134. Formed centrally in the head portion 146 between the pairs of levers 142—144 is a vertical pneumatic cylinder 148 which is open at the top and from which projects the ram or piston 149. The lower part of the cylinder 148 has communication through a port 151 opening out laterally through the side of the casting and communicating with the pipe line 125 from the pulsator 94. The upper end of the piston 149 is slotted out centrally as indicated at 152, thus providing two spaced pivot lugs 153—153 through which extends a horizontal pivot pin 154 which is secured in the lugs 153 by suitable set screws. The pivot pin 154 constitutes the knuckle of a system of toggle links for converging the rounding rolls 137 and 138 upon the sides of the book. This toggle mechanism comprises two links 155 and 156 formed with hubs 157—157' at their inner ends mounted on the pivot pin 154. The oppositely extending ends of the links 155 and 156 are of cylindrical bolt formation, and are extended through aligned apertures 158 in horizontal connecting shafts 159 and 161 which operatively connect the upper ends of the corresponding pairs of levers 142—142' and 144—144'. A short compression spring 162 is interposed on each link bolt between the hub 157—157' and the connecting shaft 159—161, and the outer end of each link bolt is threaded for the reception of a nut 163. The right-hand reduced ends of the connecting shafts 159—161 have rotatable mounting in hubs 164—164' on the upper ends of the opposite end levers 142'—144'. The other reduced ends of the shafts 159 and 161 have similar bearing support in hubs 165 on the upper ends of lever arms 166 which are pivoted on the pivot shafts 143 and 145 independently of the adjacent end levers 142 and 144. The upper ends of the levers 142 and 144 are provided with yoke members 167 which embrace the hubs 165 and which are provided with adjusting screws 168 extending through the lateral cheek pieces of the yoke members and engaging the sides of the rectangular hubs 165. By the adjustment afforded through these screws the angular relation between the two levers 144 and 166 and between the two levers 142 and 166 may be varied to produce any desired parallel or non-parallel relation between the two rounding rolls 137 and 138 with respect to each other or with respect to the sides of the hubs. The operating stroke of the piston 149 is limited by a stop plate 169 which is supported on bolts 171 rising from the top of the cylinder 148. The stop plate 169 extends diametrically across the open top of the cylinder in position to be engaged by the pivot lugs 153 when the piston is at the upper limit of its stroke; the stop plate being vertically adjustable on these supporting bolts 171 by the provision of nuts 172 and threaded sleeves 173 engaging over the threaded ends of the bolts above and below the stop plate 169. A tension spring 174 is expanded between screws 175 projecting from the yoke members 167—167 on the upper ends of the levers 142—144. This tension spring normally tends to draw the upper ends of the levers 142—142' and 144—144' together, whereby the rounding rolls 137 and 138 are normally held in diverged relation so that the book unit can be readily fed into rounding position between the same.

The rounding operation is performed pneumatically through chains 176—176' which are wound at their lower ends around flanged hubs 177—177', the extremities of the chains being secured to the hubs by suitable screws 178 or the like. The upper ends of the two chains 176—176' have connection with the top of a piston 179 which operates in a vertical pneumatic cylinder 181. The cylinder 181 is cast integral with the cylinder 148, the cylinder 181 being located in the median plane between the rounding rolls 137—138 and directly above the hubs 177—177' on the ends thereof. The lower closed end of the cylinder 181 communicates through a port 182 with the pneumatic pipe line 124 extending from the pulsator 192. The upper end of the piston 179 which projects up above the top of the cylinder 181 is formed with diametrically opposite lugs 183 (Figure 6) through which extend cap screws 184 which thread into the top of the cylinder 181 and limit the upward stroke of the piston 179. In the plane transverse of these lugs 183 the piston is formed with lugs 185 having their upper shoulders formed with a gradual curve over which are drawn the upper ends of the chains 176—176'. The upper ends of these two chains are secured to the top of the piston 179 by clamping plates 186 which are clamped down firmly on the ends of the chains by cap screws 187 tapping into the top of the piston 179. It will be apparent that a compression impulse acting in the cylinder 181 will function to raise the piston 179 and thus draw upwardly upon the chains 176—176' thereby revolving the rounding rolls inwardly, as indicated by the arrows in Figure 7 and imparting the desired degree of round to the back of the book.

Figure 5:
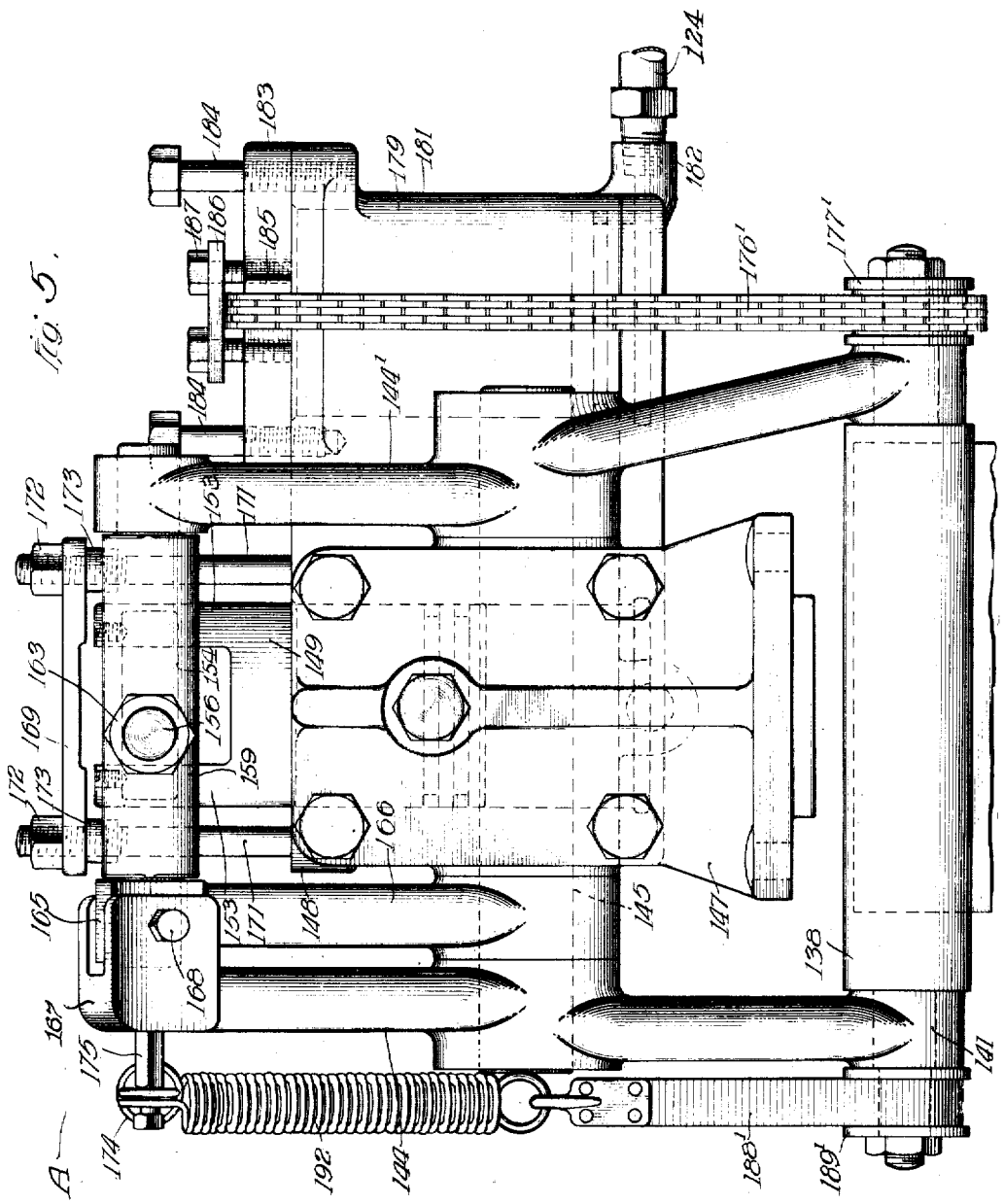
Figure 5 is an elevational view of the rounding mechanism, taken from the inside of the entire machine.

The rounding rolls are returned to normal position by flexible straps 188—188' which have their lower ends wound about and secured to flanged hubs 189—189' on the left hand end of the roller shafts 141 (as viewed in Figure 5). The upper end of each strap 188—188' is provided with an eye 191 in which is fastened the lower end of a tension spring 192. The upper ends of the two tension springs 192 are fastened to the screws 175 projecting from the yoke members 167 on the upper ends of the levers 142 and 144. The straps 188—188' are so wound upon the hubs 189—189' that the tension of the springs 192 normally tends to revolve the rounding rolls outwardly in opposition to the rounding direction of rotation, and thus the springs 192 function to return the parts including the chains 176—176' and piston 179 to normal position after the rounding operation.

In the operation of the rounding mechanism above described, as each book is advanced into position in the rounding mechanism it is first grasped between the pair of rounding rolls 137 and 138 by the converging of these two rolls upon that portion of the book projecting above the clamping members 14 and 15. The rolls are converged upon the book by the pulsator 92 transmitting a compression impulse to the cylinder 148 through pipe line 125 which raises the piston 149 and operates to straighten out the toggle joint between the toggle links 155 and 156. The straightening of this toggle joint operates through the connecting shafts 159 and 161 to swing the upper ends of the pairs of levers 142—142' and 144—144' outwardly from each other thereby converging the rounding rolls 137 and 138 upon the sides of the book. The toggle joint affords the necessary leverage for imposing the requisite pressure between the rounding rolls and the book, but this pressure is nevertheless resilient as a result of the elasticity of the air column acting on the piston 149, and of the resiliency of the springs 162 which transmit the pressure of the toggle joint to the rounding rolls, so that there is no possibility of injuring the book or the machine during the rounding operation. Immediately after the book has been gripped between the rounding rolls, a compression impulse acting in the cylinder 134 thrusts the bracket plate 135 against the ends of the spring bolts 22 and releases the book from between the clamping jaws 14 and 15. Closely following this operation by the cylinder 134, a compression impulse transmitted to the cylinder 181 raises the piston 179 therein and draws upwardly upon the chains 176 and 176', thereby imparting a limited degree of rotational motion to the rounding rolls 137 and 138 and giving the desired degree of rounding curvature to the back of the book. In the return of the several operating parts to their normal position, the piston 135 in the cylinder 134 is first retracted under a suction impulse from the pulsator so that the clamping jaw 15 is allowed to return and firmly clamp the rounded book in the link clamp. The piston 149 is then retracted into the cylinder 148 by the creation of a suction impulse in its corresponding pipe-line, whereby the toggle joint is broken and the rounding rolls are swung outwardly into separated position for receiving the next succeeding book. The piston 179 is also retracted into the cylinder 181 thereby allowing the rounding rolls to be revolved back to normal position under the action of the springs 192 and straps 188.

It will be noted that the outward operation of the levers carrying the rounding rolls is rendered positive by the engagement of the nuts 163 with the outer sides of the connecting shafts 159 and 161. The proper timing of the three pneumatic cylinders may be assisted by proportioning the springs 24, 174 and 192 to overcome the pressures existing in their respective cylinders at the proper periods in the cycle. To adapt the rounding mechanism to different sizes of books, the converging motion of the rounding rolls 137 and 138 may be readily adjusted so that the rolls will approach to any desired degree for accommodating different thicknesses of books by raising or lowering the stop plate 169 which determines the upward limit of movement of the piston 149. Similarly, by adjusting the cap screws 184 the extent of motion of the piston 179 may be adjusted so that the rounding rotation imparted to the rolls 137 and 138 may be of the proper degree for any thickness of book. The resiliency of the air column extending to the cylinder 148 cooperates with the rounding mechanism in rendering the same automatically adaptable to comparatively small irregularities and variations in the thickness of the books.

*Backing mechanism.*

From the rounding mechanism A the rounded books are conveyed by successive advancing steps of the chain conveyor 10 to the backing mechanism B, where the backing or upsetting operation is performed. Referring to Figure 8, this backing machine comprises a supporting frame 194 constructed with spaced side walls forming a hollow standard for mounting the operating parts. Mounted in bearings 195 on each of the side walls of the frame is a crank shaft 196. As shown in Figure 1, both ends of this crank shaft 196 project beyond the bearings 195, one end of the crank shaft carrying a pinion 197 through which the crank shaft is driven. The pinion 197 is driven from the large gear 88 through a pair of connected gears 198–199, which have mounting on a stub-shaft 201 extending outwardly from the side of the frame 194. The train of gearing from the large gear 88 to the pinion 197 is proportioned to transmit one complete revolution to the crank shaft 196 for each 120 degree advancement of the large gear 88. The crank portion of the shaft 196 is centered between the bearings 195, and on each side of this crank portion are mounted eccentrics 202. A bearing 203 on the crank portion of the shaft supports a connecting rod 204 which is provided at its upper end with a knuckle head 205 having pivoted connection between the two pairs of links 206—206' and 207—207'. The pair of toggle links 207—207' have pivotal connection with the forward end of a spring pressed plunger 208 which is guided in a cylindrical boss 209 formed on the top of the frame standard 194. The boss 209 is open at both ends, and extending into the outer end thereof is the hub 211' of a spring pressure plate 211. Confined between the recessed end of the plunger 208 and the recessed end of the hub 211' is a powerful compression spring 212, which resiliently backs up the plunger 208. Cap screws 213 extending through holes in the pressure plate 211 and threading into the boss 209 permit inward or outward adjustment of the pressure plate to develop any desired pressure in the spring 212. A bolt 214 is threaded or pinned at one end in the plunger 208 and has its opposite threaded end extending loosely through the pressure plate 211 for receiving an adjusting nut 215 on the outer end thereof. By the manipulation of this nut 215 the normal position of the plunger 208 can be adjusted as desired.

The other pair of toggle links 206—206' have pivotal connection with a clamping plunger 216, which is guided for reciprocating motion in a boss 217 formed on the top of the frame standard 194. The front end of this clamping plunger is adapted to engage the link clamp of each book as it is presented to the backing mechanism and impose additional clamping pressure upon the leaves of the book to prevent shifting or displacement thereof during the backing operation. The chain conveyor passes between the boss 217 and a vertical ribbed standard 218 extending upwardly from the lower part of the frame into proximity to the boss 217. The links of the chain conveyor track upon supporting rollers 219 and 221 disposed to each side of the backing machine as shown in Figure 3, each of these supporting rollers consisting of a pair of spaced integral roller wheels upon which bear the inner and outer clamping members of each link clamp (see Figure 8). Each of these supporting rollers is mounted upon a bearing shaft 222 which extends laterally from the end of the supporting arm 223 extending from the standard 218. It will be noted that as the links of the chain conveyor 10 move into or out of engagement with the sprocket pins 31 on the two end sprocket wheels, the stretch of chain between the wheels will partake of the inward and outward motion of the pins resulting from the rotation of the sprocket wheels, and consequently, the stretch of chain conveyor between these wheels will have a certain degree of lateral undulating motion concurrently with its intermittent advancing motion through the rounding and backing machines. The supporting rollers 219 and 221 are both mounted for lateral shifting motion on their bearing shafts 222 to accommodate this lateral motion of the chain conveyor, springs 224 being provided upon these bearing shafts to normally retain the rollers in their outer positions. The stretch of chain between the two sprocket wheels may also be supported at other points by supporting rollers similar to the rollers 219 and 221, such additional rollers being illustrated by the roller 220 at the rounding mechanism A (Figure 4). Each clamp entering the backing machine comes to rest substantially in the center of the machine, with the outer clamping plate 15 bearing against a vertical abutment surface 225 and having its upper edge engaging under a projecting stop lug 226. This position of the clamp places the recessed portion 29 of the inner link bar in substantial alignment with the end of the clamping plunger 216. The end of this plunger is recessed as indicated at 227, this recessed surface engaging the portion 29 of the link bar, and the projecting portion 228 of the plunger extending over and providing an upper abuttment stop for the top of the link bar 14. Upon the operation of the toggle link mechanism heretofore described, the plunger 216 is forced over against the inner clamping member 14 with considerable pressure, thus subjecting the leaves or signatures of the book to additional clamping pressure and rigidly confining the clamp and book against lateral or upward displacement by the engagement of the clamping surfaces 225—227 and the upper stop members 226 and 228 with the clamp members. A reinforcing bolt 229 is extended between hubs on the main frame 194 and the standard 218 to reinforce the upper end of the standard against the additional clamping pressure exerted by the plunger 216.

The backing operation is performed by a backing-die 231 which is provided with a curved backing surface 232 formed in its upper edge. The bottom of the die 231 is formed circular for oscillatory motion on an arcute bed 233 formed in the upper surface of a vertically reciprocable cross-head 234. The curvature of the die face 232 and of the bed 233 may be of any desired degree for imparting a definite backing curvature to the back of the book, or, if desired, different dies 231 having different degrees of curvature of their backing faces may be substituted on the arcuate bed 233. The backing operation is performed by forcing the die 231 up against the rounded back of the book and oscillating the die in contact therewith so as to upset or swage the back of the book outwardly over the flanges 28—28 on the bottoms of the clamping members 14 and 15. These flanges have relatively narrow flat surfaces along their edges to form relatively sharp corners in the upset edges of the book. By thus backing the book over appropriate backing edges formed directly on the clamping members instead of employing additional clamping members to engage the book during the backing operation the backing operation is greatly expedited and simplified.

The cross-head 234 is guided between vertical guides 235 formed on the opposing faces of the main frame 194 and the standard 218. The cross-head is supported by a relatively wide link 236 which is pivoted in the center of the cross-head, the lower end of this link 236 having a toggle connection with a pair of toggle links 237, which are pivoted to the sides of the link 236. The relatively wide link 236 is provided with pivot pin centers 238 extending laterally from each side of the link, and mounted on these centers on each side of the link are wrist bearings 239. The wrist bearings are connected to the ends of two parallel connecting rods 241 extending from the two spaced eccentrics 202. Referring only to the adjacent connecting rod illustrated in Figure 8 (both connecting rods being identical) it will be noted that the other end of this connecting rod has rigid attachment to the eccentric strap 242 which encircles the eccentric 202. The ends of this connecting rod 241 have threaded connection with the bearing member 239 and with the eccentric strap 242 in order that the length of the connecting rod may be extended or shortened by the proper screwing or unscrewing of these threaded ends in their respective sockets in the bearing member and in the eccentric strap. This is also descriptive of the crank connecting rod 204 which has threaded attachment in the knuckle coupling 205 and in the crank bearing 203 in order that it may be conveniently lengthened or shortened. The toggle links react against a pivot pin 243 which connects the lower ends of both links 237 with the upper end of a spring pressed plunger or head 244. This head has pivoted mounting on the pin 243 between the two links 237. A relatively stiff compression spring 245 is confined between the head 244 and an adjusting sleeve 246 which is screw threaded into a spider hub 247. The adjusting sleeve 246 is provided with a hand wheel 248 for screwing the sleeve up or down in order to adjust the pressure of the spring 245. A shaft 249 is threaded or pinned to the plunger or head member 244 and has its lower end extending down through the adjusting sleeve 246 and out below the bottom of the hub 247 for the reception of an adjusting wheel 251 which has threaded engagement over the lower end of the shaft 249. By manipulation of the adjusting wheel 251, the vertical position of the pivot 243 may be adjusted as desired. The limited motion of the pivot pin 243 is guided by one or more links 252 which extend between the pin 243 and a stationary pivot shaft 253. The pivot pin 243 constitutes a reaction point against which the backing pressure exerted between the backing-die 231 and the back of the book reacts. By resiliently mounting this reaction point any possibility of exerting excessive backing pressure upon the back of the book or of straining any of the operating parts is obviated. Similarly, the plunger 208 constitutes a resilient reaction point for the clamping plunger 216 so that an excessive pressure will not be exerted upon the link clamping members and so that this mechanism can readily accommodate itself to different thicknesses of books.

The oscillatory backing motion is imparted to the die 231 through a connecting link 254 at each end of the die, these two links having pivotal connection at 255 with the die and having eccentric straps encircling eccentrics 256. These two eccentrics are mounted upon a shaft 257 which is driven at relatively high speed during the intermittent operation of the machine through a gear 258 on one end thereof. This gear is driven from a large gear 259 mounted on a short shaft 261 which has bearing support in the main frame 194 and in a laterally positioned bearing 262 projecting outwardly from the side of the main frame. A small pinion 263 on this shaft 261 meshes with a large gear 264 on the crank shaft 196.

In the operation of the backing mechanism as soon as the book clamp conveying the book comes to rest in the backing machine, the shaft 196 is rotated through one complete revolution by the one step advancement of the Geneva gear 67. During the initial part of this single revolution of the shaft 196 the throw of the crank and of the eccentrics 202 operates to move the clamping plunger 216 over against the book clamp for rigidly clamping the book, and to elevate the cross-head 234 to bring the backing die 231 into operative engagement with the back of the book. The engagement of the backing die with the back of the book is gradual, and by virtue of the action of the springs 212 and 245, the clamping plunger 216 and the backing die 231 are retained in operative position during a considerable interval while the crank and eccentrics on the shaft 196 are moving through their dead center areas. The eccentrics 256 are revolving at a relatively high speed during entire rotation of the shaft 196 and consequently the backing die 231 is brought into engagement with the book while in motion, this motion continuing until the die is retracted from the book and the shaft 196 ceases rotation.

Gluing apparatus.

From the backing mechanism the book is next conveyed to gluing apparatus C (illustrated in detail in Figs. 9 and 10) where a coating of glue or other suitable adhesive is applied to the rounded and upset back of the book. This gluing apparatus is supported directly below the line of travel of the chain conveyor 10 and comprises an outer tank or receptacle 266 which is supported upon a suitable base or standard 267. Within the tank 266 is supported a glue pot 268 in which revolves a gluing roll 269. The glue pot 268 is suitably spaced from the walls of the outer receptacle 266, and an intervening body of water is heated by means of an electrical heating coil 271 which is coiled or extended in the bottom of the water receptacle 266. The adhesive applying roll 269 has its hub 272 journaled on a pivot shaft 273. The ends of the shaft 273 are yieldably supported for the purpose of having the roll 269 yieldably engage the back of the book. This is provided by rigidly fastening end hubs 274 to the ends of the shafts and supporting these hubs on long metallic strips or bands 275 which have bent ends engaging in notches 276 in the edge of the outer receptacle 266. The roll 269 is constructed with a sheet metal periphery 277 which is joined with the hub 272 by a flanged sheet metal web 278. The periphery 277 is formed with an annular depression 279 perforated by a series of holes 281 for engaging the rounded back of the book. The perforations 281 permit any excess quantity of glue applied to the back of the book to be squeezed inwardly through the periphery of the roll and to be returned to the body of glue in the glue pot 268. The hub 275 is slidable as well as rotatable upon the shaft 273, and a spring 282 is confined between the righthand end of the hub and the adjacent hub 274 for the purpose of normally retaining the roll in the dotted line position illustrated in Figure 10. The book enters into engagement with the roll in the dotted line position illustrated in this figure, but, by reason of the lateral weaving of the chain conveyor hereinbefore described, the book is shifted laterally to the full line position; wherefore by giving the roll 269 a slidable mounting on its pivotal axis the roll is also free to shift laterally with the book in this sidewise motion. A pair of supporting rollers 283, similar to the supporting rollers 219 and 221, are supported in brackets 284 extending from the outer tank 266 for supporting and guiding the chain conveyor in its travel over the gluing apparatus. These supporting rollers have provision for lateral shifting motion on their pivots, similarly to the roller 219, to permit of the lateral weaving of the chain conveyor.

Super applying mechanism.

From the gluing apparatus the book is advanced by steps around the sprocket wheel 11 to super-applying mechanism D in the return stretch of the chain conveyor on the other side of the machine. This super applying mechanism is illustrated in detail in Figs. 11 and 12. The time interval elapsing between the application of the glue to the back of the book and the presentation of the book to the super-applying mechanism is relatively long, owing to its transit around the wheel 11, and consequently the glue or other adhesive has opportunity to assume a partially dried condition for the more efficient and easier application of the super thereto. The super-applying mechanism is supported under the run of the chain conveyor upon a pedestal or standard 286. The top of the standard 286 is formed with a horizontal plate 287 on which is mounted in elevated position a water tank 288. A suitable electric heating element is disposed in this tank for the purpose of maintaining the water at sufficiently high temperature to remove any glue from the super-applying fingers, as will be later described. Directly below the point where the books come to rest at the super-applying mechanism is a supporting surface for receiving the strips of fabric to be applied to the backs of the books. This supporting surface is preferably slotted so as to consist of a series of fingers 291 and intervening parallel slots 291'. The gauze of fabric or open texture from which the super-strips are cut is fed from a roll 292 which is supported in bearing brackets 293 on the standard 286. The web from the roll 292 is extended between a pair of feeding rolls 294—294' supported on a curved bracket arm 295, the lower roll 294' being mounted for swinging motion between links 296 and being normally urged against the upper roll 294 by springs 297. From the rolls 294—294' the web is extended horizontally through a tapering guide or throat 298 which opens out upon the top of the stationary supporting surface 291.

Advancing motion is intermittently imparted to the shaft 299 of the upper feed roll 294 through a pinion 301 and gear 302, as shown in Figures 1 and 19. This pair of gears have support on a curved bracket 303 mounted to the left of the super-applying mechanism (Figure 1). Pivoted concentrically with the gear 302 is a bell-crank lever 304 on one end of which is pivoted an advancing pawl 305 engaging in the teeth of the gear 302. The other arm of the bell-crank lever 304 has pivotal connection with a connecting rod 306, which in turn has pivotal connection at its other end with a crank arm 307 revolving with the shaft 308. The shaft 308 is comparatively short and is journaled in a small bearing 309 which is bolted to the top of the pillow-block 62 which supports the main driving shaft 57 (Figure 1), a gear 311 on the other end of the shaft 308 meshing with a relatively larger gear 312 on the shaft 57 and transmitting continuous rotation to the shaft 308. The rotation of the crank arm 307 transmits an oscillatory motion to the bell-crank 304, the throw of this bell-crank in one direction merely trailing the pawl 305 across the tips of the gear teeth in the gear 302 and the return oscillation of the bell-crank in the other direction imparting an advancing rotation to the gear 302, which is multiplied to transmit the desired angular motion to the shaft 299. A detent pawl can be provided to prevent any possibility of reverse rotation of the gear 302 during the backward throw of the pawl 305.

After the web of gauze has been fed forwardly upon the stationary supporting surface 291 under the feeding action of the rolls 294—294', the web is severed by a pair of cutting blades 313—313' at the point where the web issues from the throat 298 out upon the supporting surface 291. The supporting surface 291, or rather the spaced fingers which define it, are formed integral with a bracket extension which is bolted to the wall of the tank 288, and the guide or throat 298 is either formed integral with this bracket or is suitably secured thereto. The cutting blade 313' is fixedly secured to the face of the bracket which supports the fingers 291, and the upper cooperating blade 313 is designed to have an oblique and downward shearing motion toward the lower blade across the face of a vertical flange formed integral with the guide throat 298. The oblique cutting motion of the upper blade 313 is obtained by pivotally supporting the ends of the blade between oblique pivoted arms 314 and 315. The lower end of the arm 314 has rigid mounting upon a shaft 316 which extends transversely across the super-mechanism and which has bearing support in suitable bearing hubs formed in the two oblique supporting arms 317 and 318 extending upwardly from the pedestal 286. The other arm 315 is mounted upon a stationary pivot 319 extending laterally from the bracket which supports the fingers 291. The cutting blade 313 is normally held in elevated position by a tension spring 321 which connects with the lower extending end of the arm 315. A timed oscillatory motion is intermittently transmitted to the cross-shaft 316 so as to depress the cutting blade 313 after the web of gauze has been passed forward upon the supporting surface 291 and before the super-applying fingers move up through this supporting surface This timed oscillatory motion is transmitted from a shaft 322 which has bearing support in the end of the oblique arm 317 and which extends substantially parallel with the line of travel of the chain conveyor 10. Referring to Figure 1, it will be noted that the shaft 322 carries a downwardly extending arm 323 which has pivotal connection with a connecting rod 324 extending over to the backing machine B. This connecting rod has operative connection through a suitable eccentric strap with an eccentric 325 on the outer end of the shaft 196 of the backing machine. It will be remembered that this shaft 196 is given a single complete revolution for each one step advancement of the chain conveyor 10, and the arrangement is such that this single revolution of the shaft 196 transmits a definite degree of angular oscillation to the shaft 322 during each period when the chain conveyor 10 is at rest. Mounted on the shaft 322 is a relatively short arm 326 (Figure 11) which carries a projecting pin 327 adapted to engage a similar pin 328 in the end of an arm 329 carried on the end of the cross-shaft 316. Upon actuation of the shaft 322 the downward oscillation of the pin 327 oscillates the lower pin 328 downwardly, thus rotating the shaft 316 and imparting a diagonally downwardly shearing motion to the upper blade 313 through the arm 314.

The severed strip of gauze is picked up from the stationary surface 291 and raised into adhering contact with the back of the book by a plurality of spring fingers 331. These fingers consist of a series of parallel wires or rods which are supported at their ends in an elongated hub 332 extending longitudinally of the shaft 322. The outer ends of the fingers 331 are adapted to move upwardly through the slots 291' in the stationary supporting surface 291 for carrying the severed strip of super up into engagement with the back of the book, these outer ends being curved as indicated at 333 to conform to the rounded back of the book to thereby more evenly apply the super thereto. The fingers 331 are bent to interpose a small shoulder at the point 334 for the purpose of confining the super on the outer ends of the fingers and preventing it from slipping downwardly when the fingers are raised. Shoulders 335 on the outer ends of the stationary supporting fingers 291 act as stops for preventing the strip of super from being fed or displaced over the edge of the supporting fingers 291. The several movable fingers 331 are all connected together by a cross member 336, and are bent intermediate their ends so as to enable the outer ends of the fingers to clear the upper edge of the water tank 288 for precipitation into the hot water therein.

In the operating cycle of the machine, the oscillation of the shaft 322 raises the fingers 331 and oscillates the pin 327 downwardly against the pin 328, the pin 327 having a definite degree of lead over the fingers 331 so that the shaft 316 is oscillated and the strip of super is severed from the web before the fingers 331 move up through the supporting surface 291 and engage the super. The strip of super is hence free when the fingers 331 engage it, and the super is thereafter raised into contact with the adhesive back of the book, as indicated in dotted lines in Figure 11. The resiliency of the fingers 331 enables the super to be firmly pressed against the back of the book, the curvature of the ends 333 curling the lateral projecting edges of the super up along the bottom of the clamping members 14 and 15. Upon the return oscillation of the shaft 322 the fingers 331 are moved downwardly through the slotted supporting surface 291 and their ends are immersed in the hot water tank 288; and, concurrently, the upper cutting blade 313 is raised to permit the feeding of the web of super through the guide throat 298. The feeding of the super web occurs at any time after the fingers 331 have passed downwardly through the slotted supporting surface 291 and before they are returned to this supporting surface for picking up a new strip of super. The movable fingers are retained immersed in the hot water tank 288 during substantially the advancing interval of the chain conveyor, and consequently any adhesive which may have been squeezed through the open texture of the super upon the ends of the fingers is dissolved and removed in the hot water.

In Figure 17, I have illustrated a modified form of super-applying mechanism. In this construction, the movable fingers 337 receive the super directly from the guide throat 298, instead of having the super first fed upon a stationary supporting surface and then subsequently picked up by the movable fingers. The elongated boss 338 which supports the fingers 337 is formed integral with an annular hub 339 from which extends an arm 341. A tension spring 342 is extended between this arm 341 and a stationary point 343 on the diagonal supporting arm 317, the arm 341 and the boss 338 being so related that the tension of the spring 342 normally tends to hold the outer ends of the fingers 337 at the level of the guide throat 298 in position to receive the web of super as it is fed therefrom. The hub 339 is loosely mounted on the shaft 332 and has a lost motion relation therewith through the intervention of an arcuate slot 344 in the hub which cooperates with a lug or pin 345 projecting from the shaft 322 and playing in the slot 344. The arm 326 is rigidly mounted on the shaft 322 and performs its function of oscillating the pin 328 downwardly and actuating the cutting blade 313 in the same manner as described of the previous form of machine. The outer ends of the fingers 337 are preferably curved to conform to the rounded back of the book, and to avoid any difficulties incident in feeding the web of super forward upon these curved ends, I propose providing auxiliary fingers 337' of flat formation which will receive the super directly from the guide throat 298. These auxiliary fingers are offset between the fingers 337, being supported by a cross member 336', and are relatively flexible so that they will yield upon contact with the back of the book thus allowing the relatively stiffer fingers 337 to thereafter come up and shape the super to the back of the book. In the operation of the present embodiment, the counterclockwise oscillation of the shaft 322 immediately severs the web of super at the blades 313—313' through the immediate engagement of the pin 327 with the pin 328, but, owing to the lost motion relation between the shaft 322 and the hub 339, the fingers 337' remain stationary supporting the outer end of the web of super until after the same has been severed. Thereafter, the pin 345 moves into engagement with the upper end of the slot 344 and immediately the fingers 337' are raised to bring the severed strip into engagement with the back of the book. The auxiliary fingers 337' thereupon yield and allow the curved fingers 337 to shape the super to the back of the book. In the reverse oscillation of the shaft 322, the fingers 337 follow the downward rotation of the pin 345 until the fingers reach their normal position adjacent the guiding throat 298, whereupon the continued motion of the pin 345 compels the immersion of the fingers in the hot water tank against the tension of the spring 342 by engaging in the lower end of the slot 344 and revolving the hub 339 downwardly. A short return oscillation of the shaft 322 then takes place, and this allows the fingers to return to their normal position illustrated in full lines. The web of super is fed outwardly upon the extending fingers. If the character of the material applied to the back of the book, or if other factors incident in this operation should obviate the tendency of the movable fingers to become gummed or fouled with the adhesive the cleansing operation by the hot water can be dispensed with.

From the super-applying mechanism D the book is conveyed to gluing apparatus E, which is a substantial duplicate of the gluing mechanism illustrated in Figures 9 and 10. Here the strip of super on the back of the book is given an outer coating of adhesive preparatory to superposing the strip of lining paper over the super. In certain classes of work it is possible that sufficient adhesive will permeate through the open texture of the super to dispense with the step of applying a further coating over the outside of the super.

*Paper-lining applying mechanism.*

The book is next conveyed to mechanism F for applying a strip of paper lining over the outside of the super. This mechanism (illustrated in detail in Figs. 13 to 16 inclusive) is supported upon a pedestal base 347, similarly to the super applying mechanism and is provided with a hot water tank 348 in which the movable fingers 349 are immersed after applying the strip of paper lining to the back of the book. The strip of paper is fed in a direction parallel to the course of travel of the book, upon a stationary supporting surface 351. This supporting surface consists of a series of spaced fingers 352 having spaced guide lugs 353 thereon for confining the strip of paper to the center of this supporting surface. The bracket 354 from which these fingers extend is provided at the righthand end (Figure 16) with a guiding throat 355 formed integral therewith or secured thereto in any preferred manner. Moving across the discharge opening of this guiding throat is a movable cutting blade 356 which cooperates with a lower stationary blade 357. The movable blade 356 is rigidly supported on one arm of a bell-crank lever 358 which is pivoted to the tank 348. The other arm of the bell-crank lever is engaged by a pin 359 on the end of an operating arm 361 extending from the shaft 322, this arm being normally held depressed by a spring 362 and being adapted to be raised by the actuation of the pin 359 to oscillate the cutting blade 356 diagonally downward across the discharge opening of the guiding throat 355. The strip of paper is fed through the guiding throat 355 and upon the stationary surface 351 by a pair of feeding rolls 363 and 364 engaging on opposite sides of the strip of paper, which rolls also perform the function of trimming the edges of the strip to accurate width. The upper roll 363 is keyed upon a transverse shaft 365 which has bearing support at one end in a bracket 366 and at the other end in a bearing 367 which is slung from the shaft 322. The shaft 365 projects beyond the bracket 366 and mounts a skew gear 368 which meshes with a similar gear 369 on the shaft 299 which advances the feeding rolls of both of the lining machines. The lower roll 364 is mounted on a short stub shaft 371 which is supported in an arm 372 extending from the bracket 354. The lower roll 364 is positively driven from the shaft 365 through a pair of spur gears 373 and 374. The paper is drawn from a roll 375 which is rotatably supported on the end of an arm 376 extending from the bracket 366. From the roll 375 the paper is fed up over a guide roller 380 and thence horizontally between the feeding rolls 363 and 364. The hubs of both of these rolls are constructed with a surface of rubber or other suitably gripping material for assuring firm feeding contact of the rolls with the paper. On each side of the lower roll 264 and projecting from the periphery thereof are cutting discs 377 for trimming the edges of the paper strips, these cutting discs being beveled inwardly to provide an outer circular cutting edge. The upper roll 363 is provided with a cooperating pair of cutting discs 378 which bear against the outer sides of the lower discs 377, the upper discs 378 being beveled outwardly to provide inner cutting edges for cooperation with the cutting edges of the lower discs. The discs 378 are mounted on hubs 379 which are keyed to the shaft 365 for sliding motion along said shaft. Compression springs 381 which are confined between these hubs and collars 382 fastened to the shaft 365, function to firmly press the upper discs 378 against the sides of the lower discs 377 to maintain effective cutting engagement between the discs. For different widths of books, different widths of feeding rolls and different degrees of spacing of the cutting discs may be provided.

The movable fingers 349 are all supported in an elongated hub or boss 383 on the shaft 322 and receive intermittent oscillatory motion therefrom as described of the other machine. The outer ends of these fingers are curved to conform substantially to the rounded back of the book, and cooperating with these curved ends are auxiliary fingers 385. These latter fingers are disposed one alongside of each main finger 349, these auxiliary fingers being mounted in a cross strip 386 which ties all of the fingers 349 together. As shown in the lower position of the fingers 349, the resiliency of the auxiliary fingers 385 tends to support them slightly above the curved ends of the fingers 349. The fingers 385 have flat ends formed with restraining shoulders 387, and thus during the upward motion of the fingers these flat ends come up squarely under the strip of paper and pick the same up off of the surface 251, raising the paper in flat position up into contact with the back of the book, the shoulders 387 serving as a stop to prevent the paper from slipping backward off the finger ends during the raising motion of the latter. Owing to the lesser spring pressure of the auxiliary fingers 385 these fingers yield upon contact with the book, and thereafter the main fingers 349 come up against the paper and with their greater stiffness curve the paper around the curved back of the book. As hereinbefore described in connection with the super-applying machine, I also contemplate dispensing with the stationary supporting surface in the present machine and arranging the feeding apparatus to feed the strip of paper directly upon the movable fingers 349 and 385. This would be accomplished through the interposition of a lost motion connection between the shaft 322 and the boss 383 and the use of a biasing spring for controlling the position of the movable fingers, such as will be obvious from the previous description. In the form illustrated, the movable fingers are of course, precipitated into the hot water tank for the dissolving of any adhesive thereon after the strip of paper has been applied to the back of the book.

To increase the adherence of either lining strip applied by either of the preceding machines D and F I may provide additional sets of fingers similar to the fingers 349 for applying additional pressure to the lining strip, or for applying pressure at points in the lining strip intermediate the points of pressure application of the other machines. These sets of fingers may be disposed at any resting point of the book along the course of travel of the chain conveyor. For example, the shaft 322 may be extended beyond the mechanism F to carry an additional set of fingers on the discharge side of the applying mechanism F, or such additional set of fingers may be mounted on the shaft 322 intermediate the lining-applying mechanisms D and F.

The final step in the operation of the machine is the conveyance of the book to the discharge position indicated at G in Figure 2, where the operation of the pneumatic cylinder 127 functions to separate the clamping jaws of the link and discharge the finished book unit downwardly upon a suitable receiving table or conveyor.

I do not intend to be limited to the particular details herein shown and described as it will be obvious that the present embodiment of machine chosen for illustration may be widely modified and rearranged within the spirit and scope of the invention.

I claim:

1. In a book binding machine, the combination with an automatic conveyor for feeding the books, of a movable support for applying a lining material to the books as they are presented by said automatic conveyor mechanism, means for feeding the lining material from a continuous strip and for severing the same into independent strips, said movable support comprising a main set of fingers and a secondary set of fingers of great resistancy.

2. In a book binding machine, the combination with conveyor mechanism comprising a series of book clamps, for feeding the books, said books having had adhesive applied thereto, of a supporting member for applying a flexible material to the books as they are presented by said conveyor mechanism, and means to remove adhesive from said supporting member to prevent the sticking of said pliable material thereto.

3. In a book binding machine having a conveyor mechanism for successively presenting the books to several book binding mechanisms, the combination with said conveyor mechanism of a fixed support, means for feeding a lining material to said fixed support from a continuous web of said material, means for severing said web of material into separate strips, and a movable support arranged to take each strip of lining material from said fixed support and apply it to the backs of the books as they are presented by said conveyor mechanism.

4. In a book binding machine having a conveyor mechanism for successively presenting the books to several book binding mechanisms, the combination with said conveyor mechanism of a stationary supporting member, means for feeding a strip of lining material to said stationary supporting member, and movable supporting means having movement above and below said supporting member to take the strip of lining material therefrom and present the same to the back of a book presented by said conveyor mechanism.

5. In a book binding machine having a conveyor mechanism for successively presenting the books to several book binding mechanisms, the combination with said conveyor mechanism of a slotted supporting surface below the line of travel of said conveyor mechanism, means for feeding a strip of lining material upon said supporting surface, and a plurality of pivoted fingers oscillating through said slotted supporting surface to raise said strip of lining material into adhering contact with the backs of the books.

6. In a book binding machine, the combination of means to apply a material to a book for securing the material to said book by adhesive, and means cooperating with said latter means for removing any accumulation of adhesive therefrom.

7. In a book binding machine, the combination with conveyor mechanism for successively presenting the books, said books having had adhesive applied thereto, of means for applying a material to the adhesive-covered surface of the books, and means cooperating with said latter means for removing any adhesive collecting thereon.

8. In a book binding machine, the combination with conveyor mechanism for presenting the books to a predetermined position, of means to apply a lining material to the adhesive-covered back of each book as it is moved into said predetermined position, feeding means for feeding said lining material to said applying means, and means for removing any accumulation of adhesive from said applying means between the time of applying one portion of said lining material to one book and the time of receiving another portion of said lining material from said feeding means.

9. In a book binding machine, the combination with conveyor mechanism for successively presenting the books, of a movable supporting member adapted to apply a lining material to the backs of said books, means for feeding said lining material to said supporting member, and a receptacle for liquid into which this supporting member is to be immersed for the removal of any adhesive therefrom.

10. In a book binding machine, the combination with conveyor mechanism for successively presenting the books to a predetermined position, of a stationary supporting surface below said predetermined position, means for feeding a lining material to said supporting surface, means for severing said lining material in strips, a movable supporting member to take each strip of lining material from said stationary supporting member and apply the same to the back of a book in said predetermined position, and a receptacle for hot water into which said movable supporting member is immersed after the application of a strip of lining material to one of said books.

11. In a book binding machine, the combination of an intermittently advancing conveyor mechanism for presenting the books, a slotted supporting surface below said conveyor, a pair of feeding rolls for feeding a web of lining material onto said supporting surface from a roll, cutting means for cutting said web of lining material into strips, a plurality of resilient fingers to be moved through the slots in said supporting surface for raising each strip of lining material into contact with the back of a book, a receptacle for hot water below said supporting surface, said fingers being moved downwardly through said supporting surface into said receptacle.

12. In a book binding machine, the combination of an intermittently advancing conveyor mechanism for successively presenting the books, a slotted supporting surface below said conveyor mechanism, a pair of feeding rolls to feed a web of lining material from a roll and feed the same upon said supporting surface, a guide member between said pair of feeding rolls and said supporting surface, cutting means for severing said web of lining material into strips, a plurality of resilient fingers pivotally mounted for oscillatory motion up through the slots in said supporting surface, said fingers raising each strip of lining material to contact with the back of each book, and mechanism for automatically rotating said feeding rolls, actuating said cutting means, and oscillating said fingers to raise the severed strip of lining material into contact with the back of the book, in the order named.

13. In a book binding machine, the combination of conveyor mechanism comprising a series of book clamps for successively presenting the books, a plurality of stationary fingers forming a supporting surface for receiving strips of lining material, a pair of feed rolls to feed a web of lining material from a roll thereof to said stationary fingers, a guide throat through which the web is guided between said pair of rolls and said stationary fingers, a stationary cutting blade adjacent said guide throat, a movable cutting blade cooperating with said stationary blade for cutting the web of lining material into strips, a plurality of parallel resilient fingers pivotally mounted on an operating shaft, said fingers having an oscillatory motion between said stationary fingers to raise each strip of lining material into contact with the back of a book, a receptacle for hot water, means for moving said movable fingers downwardly below said stationary fingers into said receptacle and upwardly above said stationary fingers into contact with the back of a book and means for actuating said feeding rolls and said movable cutting blades prior to upward movement of said movable fingers between said stationary fingers.

14. In a book binding machine, the combination with conveyor mechanism for successively presenting the books, a plurality of pivoted fingers, means for oscillating said fingers towards and from the back of each book, and means for automatically feeding a strip of lining material upon said fingers to be moved into contact with each book.

15. In a book binding machine, the combination of conveyor mechanism for successively presenting the books to a predetermined position, a plurality of pivoted fingers, means for oscillating said fingers towards and from the back of the book in said predetermined position, said means also oscillating said fingers into a lower receiving position for receiving a strip of lining material, feeding means for feeding the end of a continuous web of such material directly upon said fingers, cutting means for cutting the end of the web thereon into a separate strip, said fingers raising said strip into adhering engagement with the back of the book.

16. In a book binding machine, the combination of an intermittently advancing conveyor mechanism for successively presenting the books to a predetermined position, a plurality of resilient fingers below said predetermined position, means for pivotally swinging said fingers toward and away from each book, a pair of feeding rolls feeding a web of lining material, guiding means for guiding said web to a receiving point in the path of travel of said fingers, said web being fed directly upon said fingers, cutting means for severing said web to separate each strip on said fingers from said web, and a receptacle for liquid below said feeding position into which said fingers are immersed after the application of said strips to the back of the book.

17. In a book binding machine, the combination of conveyor mechanism for successively presenting the books for having the several operations performed thereon, of a stationary supporting surface substantially parallel with the line of travel of said conveyor mechanism, means for feeding a web of lining material longitudinally along said supporting surface parallel to said line of travel, means for cutting said web into independent strips upon said supporting surface, and movable means to take each strip from said stationary supporting surface and move the same into contact with the back of the book.

18. In a book binding machine, the combination with conveyor mechanism comprising a series of book clamps for successively moving the books to a predetermined position, of a stationary supporting surface below said predetermined position in the plane of travel of said conveyor mechanism, a movable supporting member having pivotal mounting to one side of said stationary supporting surface, and means for feeding a strip of lining material to said stationary supporting surface from the opposite side of said supporting surface, and actuating means for causing said movable supporting member to take said strip of fabric from said stationary surface and raise the same into contact with the back of the book.

19. In a book binding machine, the combination with conveyor mechanism comprising a series of clamps for successively presenting the books, of a stationary supporting surface below the line of travel of said clamps, means for feeding a strip of lining material upon said supporting surface in a direction parallel to the line of travel of said clamps, a movable supporting member pivoted to one side of the stationary supporting surface and the line of travel of said clamps and actuating means for giving said movable supporting member an oscillatory motion in a plane substantially at right angles to the direction of feed of said feeding means, said movable supporting member taking the strip of lining material and moving the same into contact with the back of the book.

20. In a book binding machine, the combination of automatic conveyor mechanism for successively presenting the books, an oscillatory shaft, super-applying fingers carried on said shaft, means for feeding a strip of super into position to be moved by said fingers into contact with the back of the book, a plurality of paper lining applying fingers carried by said oscillatory shaft, means for feeding a strip of paper lining into position for movement by said fingers into contact with the back of the book, and means for oscillating said shaft.

21. In a book binding machine, the combination of automatic conveyor mechanism for successively feeding the books, a feed roll shaft, super-applying mechanism comprising a member adapted to move the super into contact with the back of the book, a feed roll driven by said shaft for feeding the super into position for cooperation with said super-applying member, paper lining applying mechanism comprising a member adapted to move the strip of paper lining into contact with the back of the book, a second feed roll driven by said shaft for feeding the strip of paper lining into position for cooperation with said paper lining applying member, and means for intermittently advancing said feed roll shaft.

In witness whereof, I hereunto subscribe my name this 17th day of January, 1921.

MILTON BECK.

Certificate of Correction.

It is hereby certified that in Letters Patent No. 1,516,697, granted November 25, 1924, upon the application of Milton Beck, of Chicago, Illinois, for an improvement in " Bookbinding Machines," errors appear in the printed specification requiring correction as follows; Page 3, line 2, for the misspelled word " pivotaly " read *pivotally*, and line 81, for the word " longitduinal " read *longitudinal;* page 10, line 24, for the article " The " read *These;* page 15, line 61, claim 1, for the word " resistancy " read *resiliency;* page 16, line 123, claim 15, strike out the words " fingers raising " and insert instead *oscillatory means causing said fingers to raise;* and that the said Letters Patent should be read with these corrections therein that the same may conform to the record of the case in the Patent Office.

Signed and sealed this 6th day of January, A. D. 1925.

[SEAL.]

KARL FENNING,
*Acting Commissioner of Patents.*